US006723018B2

(12) United States Patent
Hayabuchi et al.

(10) Patent No.: US 6,723,018 B2
(45) Date of Patent: Apr. 20, 2004

(54) AUTOMATIC TRANSMISSION

(75) Inventors: Masahiro Hayabuchi, Anjo (JP);
Masaaki Nishida, Anjo (JP); Satoru Kasuya, Anjo (JP); Kenji Gotou, Anjo (JP); Toshihiko Aoki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/038,625

(22) Filed: Jan. 8, 2002

(65) Prior Publication Data

US 2002/0091032 A1 Jul. 11, 2002

(30) Foreign Application Priority Data

Jan. 9, 2001 (JP) ........................................ 2001-001594
Jan. 30, 2001 (JP) ........................................ 2001-021759

(51) Int. Cl.$^7$ ............................................... F16H 3/62
(52) U.S. Cl. ........................................ 475/276; 475/277
(58) Field of Search ................................. 475/275, 276, 475/277

(56) References Cited

U.S. PATENT DOCUMENTS

| | | | |
|---|---|---|---|
| 3,853,023 A | * 12/1974 | Mori et al. ................ | 475/275 |
| 3,863,524 A | * 2/1975 | Mori et al. ................ | 475/275 |
| 4,788,887 A | 12/1988 | Lepelletier | |
| 5,106,352 A | 4/1992 | Lepelletier | |
| 5,437,584 A | * 8/1995 | Garrett et al. ............ | 475/275 |
| 5,520,587 A | 5/1996 | Hall, III | |
| 5,520,588 A | 5/1996 | Hall, III | |
| 6,110,069 A | 8/2000 | Taniguchi et al. | |
| 6,120,410 A | 9/2000 | Taniguchi et al. | |
| 6,135,912 A | 10/2000 | Tsukamoto et al. | |
| 6,139,463 A | 10/2000 | Kasuya et al. | |
| 6,176,802 B1 | 1/2001 | Kasuya et al. | |
| 6,558,287 B2 | 5/2003 | Hayabuchi et al. | |

* cited by examiner

*Primary Examiner*—Dirk Wright
(74) *Attorney, Agent, or Firm*—Oliff & Berridge, PLC

(57) ABSTRACT

A speed-reducing gear unit is provided for causing a reduced-speed rotation output member to have a reduced rotation that is slower than rotation of an input shaft. The reduced-speed rotation output member is switched between a reduced-speed rotation state and a free rotation state by rotation state switching means. The reduced-speed rotation of the reduced-speed rotation output member is selectively transferred to fourth and first elements of a speed-changing dual planetary gear unit via first and third control clutches. The rotation of the input shaft is transferred to a second element via a second control clutch. Rotations of the first and second elements are selectively restricted by first and second control brakes. A third element is connected to an output shaft. This makes it possible to provide a high-efficiency automatic transmission that achieves seven or more forward gear ratios so as to allow optimal extraction of engine performance in a high vehicle speed region and reduce the vehicle speed change at the time of a gear shift and therefore provide a good feeling, by adding gear speeds including a locked-up speed at a high gear speed side so that adjacent gear ratios are closer to each other.

61 Claims, 18 Drawing Sheets

| | C-1 | C-2 | C-3 | B-1 | B-2 | B-3 | B-4 | F-1 | GEAR RATIO |
|---|---|---|---|---|---|---|---|---|---|
| 1st | ● | | | | ● | | (●) | ● | 4.741 |
| 2nd | ● | | | ● | | | (●) | ● | 3.630 |
| 3rd | ● | | | | ● | ● | | | 2.709 |
| 4th | ● | | | ● | | ● | | | 2.074 |
| 5th | ● | | ● | | ● | | | | 1.778 |
| 6th | ● | | ● | ● | | | | | 1.361 |
| 7th | ● | ● | | | ● | | | | 1.196 |
| 8th | ● | ● | | ● | | | | | 1.100 |
| 9th | ● | ● | ● | | | | | | 1.000 |
| 10th | | ● | ● | ● | | | | | 0.892 |
| 11th | | ● | ● | | ● | | | | 0.833 |
| 12th | | ● | | | ● | ● | | | 0.686 |
| (12th) | | ● | | | ● | ● | | | 0.686 |
| REV1 | | | ● | | ● | | ● | | 3.879 |
| REV2 | | | ● | ● | | | ● | | 2.970 |

$\lambda 1=0.778, \lambda 2=0.361, \lambda 3=0.458, \lambda 4=0.375$

| | C-1 | C-2 | C-3 | B-1 | B-2 | B-3 | B-4 | F-1 | GEAR RATIO |
|---|---|---|---|---|---|---|---|---|---|
| 1st | ● | | | | ● | | (●) | ● | 5.843 |
| 2nd | ● | | | | ● | ● | | | 3.652 |
| 3rd | ● | | | ● | | | (●) | ● | 3.339 |
| 4th | ● | | ● | ● | | | | | 2.435 |
| 5th | ● | | | ● | | ● | | | 2.087 |
| 6th | ● | | ● | ● | | | | | 1.391 |
| 7th | ● | ● | | | ● | | | | 1.325 |
| 8th | ● | ● | | ● | | | | | 1.133 |
| 9th | ● | ● | ● | | | | | | 1.000 |
| 10th | | ● | ● | ● | | | | | 0.865 |
| 11th | | ● | ● | | ● | | | | 0.753 |
| 12th | | ● | | ● | | ● | | | 0.643 |
| (12th) | | ● | | | ● | ● | | | 0.643 |
| REV1 | | | ● | | ● | | ● | | 4.383 |
| REV2 | | | ● | ● | | | ● | | 2.504 |

$\lambda 1=0.273, \lambda 2=0.391, \lambda 3=0.556, \lambda 4=0.417$

| | C-1 | C-2 | C-3 | C-4 | B-3 | B-4 | B-2 | F-1 | GEAR RATIO |
|---|---|---|---|---|---|---|---|---|---|
| 1st | ● | | | | | (●) | ● | ● | 3.778 |
| 2nd | ● | | | ● | | (●) | | ● | 2.667 |
| 3rd | ● | | | | ● | | | ● | 2.159 |
| 4th | ● | | | ● | ● | | | | 1.524 |
| 5th | ● | | ● | | | | | ● | 1.417 |
| 6th | ● | ● | | | | | | ● | 1.124 |
| 7th | ● | ● | ● | | | | | | 1.000 |
| 8th | | ● | ● | | | | ● | | 0.881 |
| 9th | | ● | | | ● | | ● | | 0.686 |
| (9th) | | ● | | ● | ● | | | | 0.686 |
| REV1 | | | ● | | | ● | ● | | 3.091 |
| REV2 | | | ● | ● | | ● | | | 2.182 |

λ2=0.417, λ3=0.458, λ4=0.375

| | C-1 | C-2 | C-3 | B-3 | B-4 | B-2 | F-1 | GEAR RATIO |
|---|---|---|---|---|---|---|---|---|
| 1st | ● | | | | (●) | ● | ● | 4.148 |
| 2nd | ● | | | ● | | ● | | 2.370 |
| 3rd | ● | | ● | | | ● | | 1.556 |
| 4th | ● | ● | | | | ● | | 1.155 |
| 5th | ● | ● | ● | | | | | 1.000 |
| 6th | | ● | ● | | | ● | | 0.859 |
| 7th | | ● | | ● | | ● | | 0.686 |
| (7th) | | ● | ● | ● | | | | 0.686 |
| (7th) | ● | ● | | ● | | | | 0.686 |
| REV | | | ● | | ● | ● | | 3.091 |

λ 2=0.556, λ 3=0.458, λ 4=0.375

AUTOMATIC TRANSMISSION

INCORPORATION BY REFERENCE

The disclosure of Japanese Patent Application No. 2001-001594 filed on Jan. 9, 2001 and No. 2001-021759 filed on Jan. 30, 2001, each including the specification, drawings and abstract, is incorporated herein by reference in its entirety.

BACKGROUND OF THE INVENTION

1. Field of Invention

The invention relates to an automatic transmission that shifts rotation of an input shaft at a selected one of a plurality of speed ratios and transfers the thus-shifted rotation to an output shaft by engaging and disengaging control clutches and control brakes connected to various elements of a speed-changing dual planetary gear unit connected to the input shaft.

2. Description of Related Art

U.S. Pat. No. 5,106,352 discloses an automatic transmission that includes: a speed-changing dual planetary gear unit having first and second sun gears, a long pinion that directly meshes with the first sun gear and that meshes with the second sun gear via an intermediate pinion, a carrier that supports the long pinion and the intermediate pinion, and a ring gear that meshes with the long pinion and that is connected to an output shaft; and a speed-reducing planetary gear having a ring gear connected to an input shaft, a sun gear fixed to a transmission case, and a carrier that supports a pinion meshed with the ring gear and the sun gear. This automatic transmission achieves six forward gear ratios and one reverse gear ratio by selectively transferring the rotation of the carrier of the speed-reducing planetary gear unit that has been reduced in speed so that the rotation speed of the carrier is less than the rotation speed of the input shaft to the second and first sun gears through the use of first and third control clutches, and by selectively transferring the rotation of the input shaft to the carrier of the speed-changing dual planetary gear unit through the use of a second control clutch, and by selectively restricting the rotations of the first sun gear and the carrier of the speed-changing dual planetary gear unit through the use of first and second control brakes.

This conventional automatic transmission has a small entire length, and is therefore suitable for a front-wheel drive vehicle with a transversely mounted engine. In recent years, however, there is a demand for an automatic transmission capable of achieving seven or more forward gear ratios that are appropriately spaced, in order to improve fuel economy and power transfer performance or to provide gear ratios that match a driver's taste.

SUMMARY OF THE INVENTION

Accordingly, it is an object of the invention to provide a high-efficiency automatic transmission that achieves seven or more forward gear ratios so as to allow optimal extraction of engine performance in a high vehicle speed region and reduces changes in output torque during gear shifting by adding a gear speed including a locked-up speed at a high gear speed side so that adjacent gear ratios are closer to each other. This results in smooth gear to gear transitions and, thus, a smoother, more pleasurable ride.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figures 1, 2:
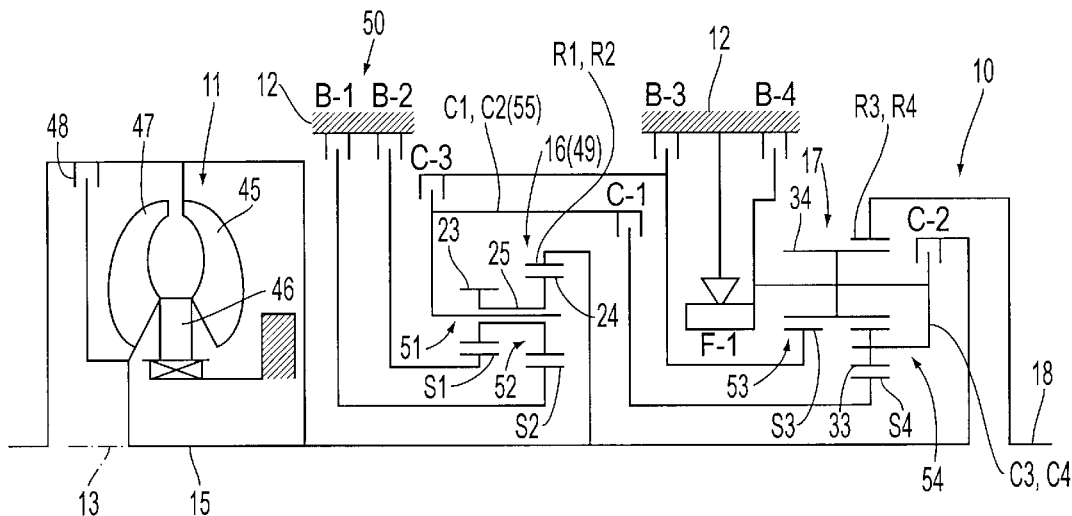
FIG. 1 is a skeleton diagram illustrating a first embodiment of the automatic transmission of the invention.
FIG. 2 is a table showing the states of operation of control brakes and control clutches for various gear speeds in the first embodiment.

A first preferred embodiment of the automatic transmission of the invention will be first described below with reference to the accompanying drawings. Referring to FIG. 1, an automatic transmission 10 in accordance with the invention is used to change the speed of the output rotation of a fluid torque converter 11 that is driven by, for example, a motor vehicle engine, and to transfer the speed-changed rotation to driving wheels. The automatic transmission 10 includes an input shaft 15, a speed-reducing dual planetary gear unit 16, a speed-changing dual planetary gear unit 17, and an output shaft 18 that are sequentially supported on a common axis 13 within a transmission case 12 mounted on a vehicle body. The speed-reducing dual planetary gear unit 16 is formed by coupling and integrating the carrier C1, C2 and ring gear R1, R2 of two single-pinion type planetary gear mechanisms 51, 52. Specifically, the speed-reducing dual planetary gear unit 16 includes a large-diameter sun gear S1 and a small-diameter sun gear S2 that are rotatably supported on the common axis 13, stepped pinions 25 each formed by a small-diameter pinion 23 and a large-diameter pinion 24 that mesh with the large-diameter sun gear S1 and the small-diameter sun gear S2, respectively, a common carrier C1, C2 that rotatably supports the stepped pinions 25 and is rotatably supported on the common axis 13, and a common ring gear R1, R2 that meshes with the large-diameter pinions 24 and that is rotatably supported on the common axis 13. The input shaft 15 is connected to the ring gear R1, R2

Second and first rotation control brakes B-2, B-1 for selectively restricting rotations by connecting the large-diameter and small-diameter sun gears S1, S2 to the transmission case 12 are connected to the large-diameter and small-diameter sun gears S1, S2, respectively. Therefore, the carrier C1, C2, as a reduced-speed rotation output member 55, can be switched among a first reduced-speed rotation state in which the rotation of the small-diameter sun gear S2 is restricted by the first rotation control brake B-1 so that the carrier C1, C2 has a first reduced-speed rotation that is slower than the rotation of the input shaft 15, a second reduced-speed rotation state in which the rotation of the large-diameter sun gear S1 is restricted by the second rotation control brake B-2 so that the carrier C1, C2 has a second reduced-speed rotation speed that is slower than the first reduced-speed rotation, and a free rotation state in which the first and second rotation control brakes B-1, B-2 are in a disengaged state so that rotation is not restricted.

The speed-reducing dual planetary gear unit 16 forms a speed-reducing gear unit 49 that is connected to the input shaft 15 and that generates the first and second reduced-speed rotations that are slower than the rotation of the input shaft 15. The first and second rotation control brakes B-1, B-2 form a rotation state switching means 50 for switching the carrier C1, C2, as the reduced-speed rotation output member 55, between the reduced-speed rotation states and the free rotation state.

The speed-changing dual planetary gear unit 17 is formed by connecting and integrating the carrier C3, C4 and ring gear R3, R4 of a single-pinion type planetary gear mechanism 53 and a double-pinion type planetary gear mechanism 54. Specifically, the speed-changing dual planetary gear unit 17 includes first and second sun gears S3, S4 rotatably supported on the common axis 13, long pinions 34 that directly mesh with the first sun gear S3 and that mesh with the second sun gear S4 via intermediate pinions 33, a common carrier C3, C4 that rotatably supports the long pinions 34 and the intermediate pinions 33 and that is rotatably supported on the common axis 13, and a common ring gear R3, R4 that meshes with the long pinions 34 and that is rotatably supported on the common axis 13. The ring gear R3, R4 is connected to the output shaft 18.

Third and first control clutches C-3, C-1 are provided for selectively connecting the carrier C1, C2 of the speed-reducing dual planetary gear unit 16 to the first and second sun gears S3, S4 of the speed-changing dual planetary gear unit 17, respectively. A second control clutch C-2 is provided for selectively connecting the input shaft 15 to the common carrier C3, C4 of the speed-changing dual planetary gear unit 17. The first sun gear S3 and the carrier C3, C4 are connected with first and second control brakes B-3, B-4, respectively, which selectively connect the first sun gear S3 and the carrier C3, C4 to the transmission case 12 so as to restrict rotation thereof. A one-way clutch F-1 is provided for restricting reverse rotation of the carrier C3, C4.

A pump impeller 45 of the fluid torque converter 11 is turned by the engine (not shown) so as to deliver oil. With a stator 46 receiving reaction force from oil, torque is generated on a turbine 47. The input shaft 15 is connected to the turbine 47. A lockup clutch 48 is provided for directly connecting the pump impeller 45 and the turbine 47.

The automatic transmission 10 constructed as described above is able to achieve gear ratios of 12 forward speeds and 2 reverse speeds by selectively engaging and disengaging the first to third control clutches C-1 to C-3, and by restricting rotations of elements of the planetary gear units through selective actuation of the first and second control brakes B-3, B-4 and the first and second rotation control brakes B-1, B-2. In the table of FIG. 2, solid circles in boxes of the control clutches and the control brakes corresponding to the gear speeds indicate a connected state for the control clutches, and a rotation restricting state for the control brakes. The column of gear ratios shows gear ratios (rotation speed of the input shaft 15/rotation speed of the output shaft 18) of the gear speeds achieved in a case where a speed-reducing first planetary gear mechanism 51 formed by the large-diameter sun gear S1, the stepped pinions 25, the carrier C1 and the ring gear R1 has a gear ratio $\lambda 1$ of 0.778, and a speed-reducing second planetary gear mechanism 52 formed by the small-diameter sun gear S2, the large-diameter pinions 24, the carrier C2 and the ring gear R2 has a gear ratio $\lambda 2$ of 0.361, and a speed-changing first planetary gear mechanism 53 formed by the first sun gear S3, the long pinions 34, the carrier C3 and the ring gear R3 of the speed-changing dual planetary gear unit 17 has a gear ratio $\lambda 3$ of 0.458, and a speed-changing second planetary gear mechanism 54 formed by the second sun gear S4, the intermediate pinions 33, the long pinions 34, the carrier C4 and the ring gear R4 has a gear ratio $\lambda 4$ of 0.375.

In the speed-reducing first and second planetary gear mechanisms 51, 52 and the speed-changing first planetary gear mechanism 53 that are of the single-pinion type, a relationship among a sun gear rotation speed Ns, a carrier rotation speed Nc, a ring gear rotation speed Nr, and the gear ratio $\lambda$ of the planetary gear mechanism is expressed by equation (1). In the double-pinion type speed-changing second planetary gear mechanism 54, a relationship among the sun gear rotation speed Ns, the carrier rotation speed Nc, the ring gear rotation speed Nr, and the gear ratio λ of the planetary gear mechanism is expressed by equation (2). The gear ratio of each gear speed is calculated based on equations (1) and (2). Where the numbers of teeth of the large-diameter, small-diameter, first and second sun gears S1, S2, S3, S4 are expressed as Zs1, Zs2, Zs3, Zs4, and the numbers of teeth of the ring gears R1, R2, R3, R4 are expressed as Zr1, Zr2, Zr3, Zr4, the gear ratios of the speed-reducing first and second planetary gear mechanisms 51, 52 and the speed-changing first and second planetary gear mechanisms 53, 54 can be written as λ1=Zs1/Zr1, λ2=Zs2/Zr2, λ3=Zs3/Zr3, λ4=Zs4/Zr4, respectively.

$$Nr=(1+\lambda)Nc-\lambda Ns \quad (1)$$

$$Nr=(1-\lambda)Nc+\lambda Ns \quad (2)$$

Figure 3:
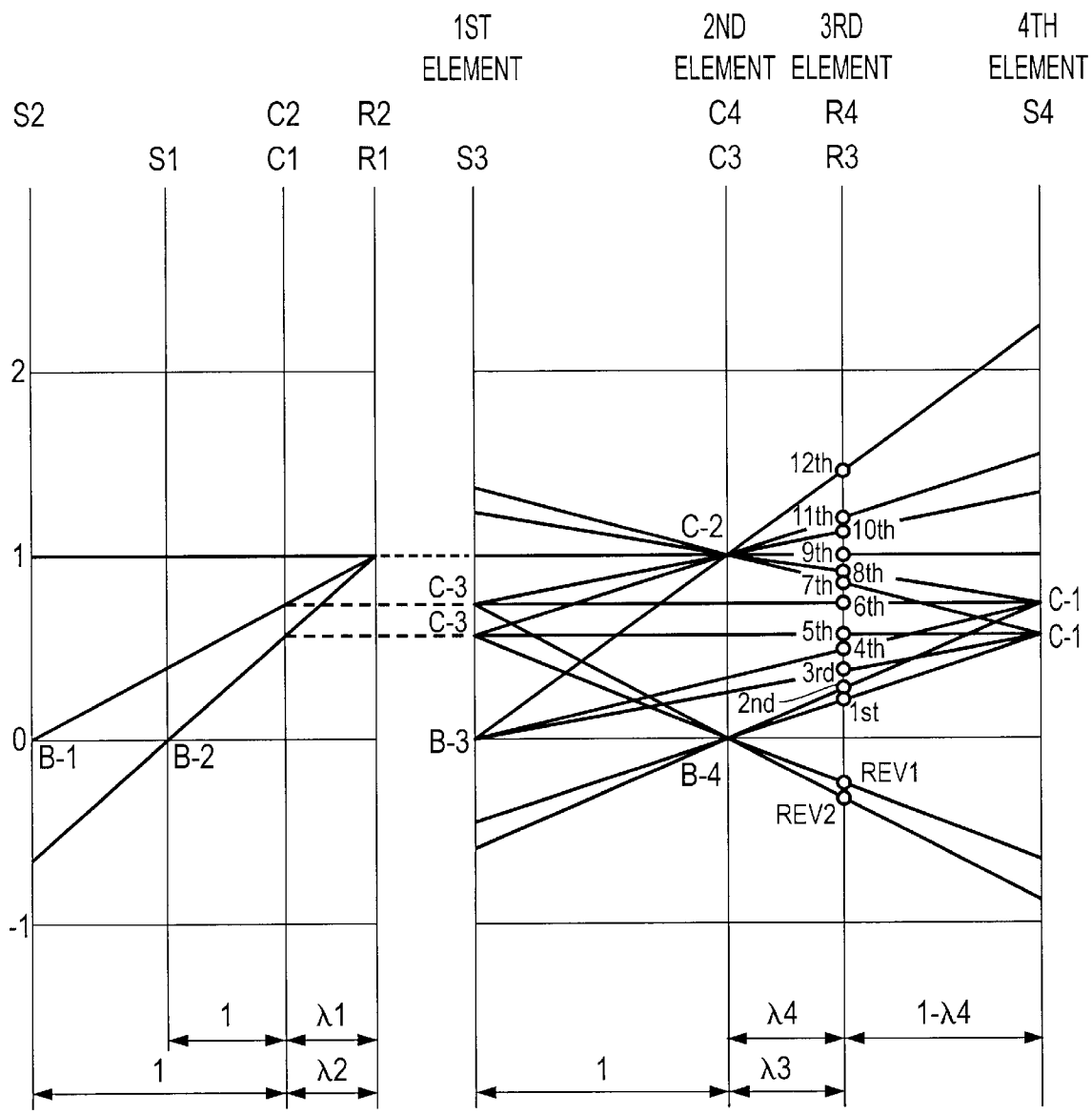
FIG. 3 is a speed diagram indicating the rotation ratios of various elements of a planetary gear unit at the gear speeds in the first embodiment.

If the first and second rotation control brakes B-1, B-2 are selectively actuated and the first to third control clutches C-1 to C-3 are selectively connected and the first and second control brakes B-3, B-4 are selectively actuated, the speed ratios of the various elements of the speed-reducing dual planetary gear unit 16 and the speed-changing dual planetary gear unit 17 become as indicated by a speed diagram shown in FIG. 3. In the speed diagram, the elements of the planetary gear mechanisms, that is, the sun gears, the carriers and the ring gears, are arranged in the direction of a horizontal axis at intervals corresponding to the gear ratios, and the speed ratios are indicated corresponding to the various elements in the direction of a vertical axis. In FIG. 3, the speed diagram of the speed-reducing dual planetary gear unit 16 and the speed diagram of the speed-changing dual planetary gear unit 17 are shown side by side. As for the speed-reducing first and second planetary gear mechanisms 51, 52 of the speed-reducing dual planetary gear unit 16, the carriers C1, C2 and the ring gears R1, R2 are respectively integrated. Therefore, the speed ratio of the common carrier C1, C2 and the speed ratio of the common ring gear R1, R2 are indicated by a vertical line denoted by C1, C2 and a vertical line denoted by R1, R2, respectively. The speed ratio of the first sun gear S1 and the speed ratio of the second sun gear S2 are indicated by a vertical line denoted by S1 and a vertical line denoted by S2, respectively. As for the single-pinion type first planetary gear mechanism 51, an interval between the vertical line of the carrier C1 and the vertical line of the ring gear R1 is regarded as the gear ratio λ1 of the first planetary gear mechanism 51, and the vertical line of the sun gear S1 is disposed at a side of the vertical line of the carrier C1 opposite from the vertical line of the ring gear R1, with an interval a/λ1 being left between the vertical line of the first sun gear S1 and the vertical line of the carrier C1. Likewise, as for the single-pinion type second planetary gear mechanism 52, an interval a between the vertical line of the carrier C2 and the vertical line of the ring gear R2 is regarded as the gear ratio λ2 of the second planetary gear mechanism 52, and the vertical line of the second sun gear S2 is disposed at a side of the vertical line of the carrier C2 opposite from the vertical line of the ring gear R2, with an interval a/λ2 being left between the vertical line of the second sun gear S2 and the vertical line of the carrier C2.

As for the speed-changing first and second planetary gear mechanisms 53, 54 of the speed-changing dual planetary gear unit 17, the carriers C3, C4 and the ring gears R3, R4 are respectively integrated. Therefore, the speed ratio of the common carrier C3, C4 and the speed ratio of the common ring gear R3, R4 are indicated on a vertical line denoted by C3, C4 and a vertical line denoted by R3, R4, respectively. The speed ratio of the first sun gear S3 and the speed ratio of the second sun gear S4 are indicated by a vertical line denoted by S3 and a vertical line denoted by S4, respectively. As for the single-pinion type speed-changing first planetary gear mechanism 53, an interval b between the vertical line of the carrier C3 and the vertical line of the ring gear R3 is regarded as the gear ratio λ3 of the speed-changing first planetary gear mechanism 53, and the vertical line of the first sun gear S3 is disposed at a side of the vertical line of the carrier C3 opposite from the vertical line of the ring gear R3, with an interval b/λ3 being left between the vertical line of the first sun gear S3 and the vertical line of the carrier C3. As for the double-pinion type speed-changing second planetary gear mechanism 54, an interval b between the vertical line of the carrier C4 and the vertical line of the ring gear R4 is regarded as the gear ratio λ4 of the speed-changing second planetary gear mechanism 54, and the vertical line of the second sun gear S4 is disposed at a side of the vertical line of the carrier C4 where the vertical line of the ring gear R4 is also disposed, with an interval b/λ4 being left between the vertical line of the second sun gear S4 and the vertical line of the carrier C4. In the speed diagrams, B-1 to B-4 and C-1 to C-3 are indicated at points where the first and second rotation control brakes B-1, B-2, the first to third control clutches C-1 to C-3, and the first and second control brakes B-3, B-4 are selectively actuated.

In the speed diagram of the speed-changing dual planetary gear unit 17 prepared as described above, the elements corresponding to the four vertical lines will be termed first element, second element, third element and fourth element, in the order of arrangement of the four vertical lines. Namely, the speed-changing dual planetary gear unit 17 has the first element, the second element, the third element and the fourth element corresponding to the order of four elements arranged at intervals corresponding to each gear ratio in the speed diagram. Furthermore, as shown in FIG. 3, the speed diagram indicates the gear ratios of each element with vertical lines, i.e., the first element, the second element, the third element and the fourth element are arranged in order of rotational speed excepting the fifth forward speed and the sixth forward speed in which each element is rotated integrally. Namely, the speed-changing dual planetary gear unit 17 has the first element, the second element, the third element and the fourth element arranged in order of rotational speed. In the first embodiment, the first sun gear S3, as the first element, is connected to the third control clutch C-3 and the first control brake B-3; the carrier C3, as the second element, is connected to the second control clutch C-2 and the second control brake B-4; the ring gear R3, R4, as the third element, is connected to the output shaft 18; and the second sun gear S4, as the fourth element, is connected to the first control clutch C-1.

The operation for each gear speed will be described below. In the case of the first forward gear speed, the second rotation control brake B-2, forming the rotation state switching means 50, is actuated to stop the rotation of the large-diameter sun gear S1, so that the carrier C1, C2 as the reduced-speed rotation output member 55 is switched to the second reduced-speed rotation state. Furthermore, the first control clutch C-1 is actuated to connect the carrier C1, C2 and the second sun gear S4, and the one-way clutch F-1 is actuated to restrict reverse rotation of the carrier C3, C4. Therefore, rotation of the input shaft 15 is reduced in speed to a second reduced-speed rotation that is slower than the rotation of the input shaft 15, by the ring gear R1, R2, the large-diameter first sun gear S1, restricted in rotation and bearing reaction force, and the carrier C1, C2. The rotation is then transferred to the ring gear R3, R4 via the first control clutch C-1, the second sun gear S4, and the carrier C3, C4 whose reverse rotation is restricted by the one-way clutch F-1 so as to bear reaction force, thereby forwardly driving the output shaft 18 at a gear ratio of 4.741 of the first gear speed. It is also possible to restrict rotation of the carrier C3, C4 by actuating the second control brake B-4.

In the case of the second forward gear speed, the small-diameter second sun gear S2 is restricted in rotation by the first rotation control brake B-1, which forms the rotation state switching means 50, so that the carrier C1, C2 is switched to the first reduced-speed rotation state. Furthermore, the control clutch C-1 is actuated to connect the carrier C1, C2 and the second sun gear S4, and the one-way clutch F-1 is actuated to restrict reverse rotation of the carrier C3, C4. Therefore, rotation inputted to the input shaft 15 is reduced in speed to a first reduced-speed rotation that is slower than the rotation of the input shaft 15 and is faster than the second reduced-speed rotation, by the ring gear R1, R2, the small-diameter second sun gear S2, restricted in rotation and bearing reaction force, and the carrier C1, C2. The rotation is then transferred to the ring gear R3, R4 via the first control clutch C1, the second sun gear S4, and the carrier C3, C4 whose reverse rotation is restricted by the one-way clutch F-1 so as to bear reaction force, thereby forwardly driving the output shaft 18 at a gear ratio of 3.630 of the second gear speed.

In the case of the third forward gear speed, the second rotation control brake B-2 is actuated to restrict rotation of the large-diameter first sun gear S1, so that the carrier C1, C2 is switched to the second reduced-speed rotation state. Furthermore, the first control clutch C-1 is actuated to connect the carrier C1, C2 and the second sun gear S4, and the first control brake B-3 is actuated to restrict rotation of the first sun gear S3. Therefore, rotation inputted to the input shaft 15 is reduced in speed to the second reduced-speed rotation, by the ring gear R1, R2, the large-diameter first sun gear S1, restricted in rotation and bearing reaction force, and the carrier C1, C2. The rotation is then transferred to the ring gear R3, R4 via the first control clutch C-1, the second sun gear S4, the first sun gear S3 restricted in rotation so as to bear reaction force, and the carrier C3, C4, thereby forwardly driving the output shaft 18 at a gear ratio of 2.709 of the third gear speed.

In the case of the fourth forward gear speed, the first rotation control brake B-1 is actuated to restrict rotation of the small-diameter second sun gear S2, so that the carrier C1, C2 is switched to the first reduced-speed rotation state. Furthermore, the first control clutch C-1 is actuated to connect the carrier C1, C2 and the second sun gear S4, and the first control brake B-3 is actuated to restrict rotation of the first sun gear S3. Therefore, rotation inputted to the input shaft 15 is reduced in speed to the first reduced-speed rotation, by the ring gear R1, R2, the small-diameter second sun gear S2, restricted in rotation and bearing reaction force, and the carrier C1, C2. The rotation is then transferred to the ring gear R3, R4 via the first control clutch C-1, the second sun gear S4, the first sun gear S3, restricted in rotation so as to bear reaction force, and the carrier C3, C4, thereby forwardly driving the output shaft 18 at a gear ratio of 2.074 of the fourth gear speed.

In the case of the fifth forward gear speed, the second rotation control brake B-2 is actuated to restrict rotation of the large-diameter first sun gear S1, so that the carrier C1, C2 is switched to the second reduced-speed rotation state. Furthermore, the first control clutch C-1 and the third control clutch C-3 are actuated to connect the carrier C1, C2 to the second sun gear S4 and the first sun gear S3, respectively. Therefore, rotation of the input shaft 15 is reduced in speed to the second reduced-speed rotation, by the ring gear R1, R2, the large-diameter first sun gear S1, restricted in rotation and bearing reaction force, and the carrier C1, C2. The rotation is then transferred to the second and first sun gears S4, S3 via the first and third control clutches C-1, C-3 so that the ring gear R3, R4 is rotated via the carrier C3, C4 in accordance with the rotation of the first and second sun gears S3, S4. As a result, the output shaft 18 is forwardly driven at a gear ratio of 1.778 of the fifth gear speed.

In the case of the sixth forward gear speed, the first rotation control brake B1 is actuated to restrict rotation of the small-diameter sun gear S2, so that the carrier C1, C2 is switched to the first reduced-speed rotation state. Furthermore, the first control clutch C-1 and the third control clutch C-3 are actuated to connect the carrier C1, C2 to the second sun gear S4 and the first sun gear S3. Therefore, rotation of the input shaft 15 is reduced in speed to the first reduced-speed rotation, by the ring gear R1, R2, the small-diameter second sun gear S2, restricted in rotation and bearing reaction force, and the carrier C1, C2. The rotation is then transferred to the second and first sun gears S4, S3 via the first and third control clutches C-1, C-3 so that the ring gear R3, R4 is rotated via the carrier C3, C4 in accordance with the rotation of the first and second sun gears S3, S4. As a result, the output shaft 18 is forwardly driven at a gear ratio of 1.361 of the sixth gear speed.

In the case of the seventh forward gear speed, the second rotation control brake B-2 is actuated to restrict rotation of the large-diameter sun gear S1, so that the carrier C1, C2 is switched to the second reduced-speed rotation state. Furthermore, the first control clutch C-1 and the second control clutch C-2 are actuated to connect the carrier C1, C2 to the second sun gear S4 and connect the input shaft 15 to the carrier C3, C4. Therefore, rotation of the input shaft 15 is reduced in speed to the second reduced-speed rotation, by the ring gear R1, R2, the large-diameter first sun gear S1, restricted in rotation and bearing reaction force, and the carrier C1, C2. The rotation is then transferred to the second sun gear S4 via the first control clutch C-1. Simultaneously, the rotation of the input shaft 15 is directly transferred to the carrier C3, C4 via the second control clutch C-2. As a result, the ring gear R3, R4 is rotated in accordance with the difference between the rotation of the second sun gear S4 and the rotation of the carrier C3, C4, thereby forwardly driving the output shaft 18 at a gear ratio of 1.196 of the seventh gear speed.

In the case of the eighth forward gear speed, the first rotation control brake B-1 is actuated to restrict rotation of the small-diameter sun gear S2, so that the carrier C1, C2 is switched to the first reduced-speed rotation state. Furthermore, the first control clutch C-1 and the second control clutch C-2 are actuated to connect the carrier C1, C2 to the second sun gear S4 and connect the input shaft 15 to the carrier C3, C4. Therefore, rotation of the input shaft 15 is reduced in speed to the first reduced-speed rotation, by the ring gear R1, R2, the small-diameter second sun gear S2, restricted in rotation and bearing reaction force, and the carrier C1, C2. The rotation is then transferred to the second sun gear S4 via the first control clutch C-1. Simultaneously, the rotation inputted to the input shaft 15 is directly transferred to the carrier C3, C4 via the second control clutch C-2. As a result, the ring gear R3, R4 is rotated in accordance with the difference between the rotation of the second sun gear S4 and the rotation of the carrier C3, C4, thereby forwardly driving the output shaft 18 at a gear ratio of 1.100 of the eighth gear speed.

In the case of the ninth forward gear speed, the first, second and third control clutches C-1, C-2, C-3 are connected to connect the first and second sun gears S3, S4 via the carrier C1, C2 as the reduced-speed rotation output member 55. Furthermore, the first and second rotation control brakes B-1, B-2, as the rotation state switching means 50, remain un-actuated so that the carrier C1, C2 is in a freely rotatable state. Therefore, rotation of the input shaft 15 is directly transferred to the carrier C3, C4 of the speed-changing dual planetary gear unit 17 via the second control clutch C-2, so that the ring gear R3, R4 is rotated via the interlocked first and second sun gears S3, S4. As a result, the ring gear R3, R4 is forwardly driven at a gear ratio of 1.000 of the ninth gear speed.

In the case of the tenth forward gear speed, the first rotation control brake B1 is actuated to restrict rotation of the small-diameter second sun gear S2 so that the first carrier C1, C2 is switched to the first reduced-speed rotation state. Furthermore, the third control clutch C-3 and the second control clutch C-2 are actuated to connect the carrier C1, C2 to the first sun gear S3 and connect the input shaft 15 to the carrier C3, C4. Therefore, rotation of the input shaft 15 is reduced in speed to the first reduced-speed rotation, by the ring gear R1, R2, the small-diameter second sun gear S2, restricted in rotation and bearing reaction force, and the carrier C1, C2. The rotation is then transferred to the first sun gear S3 via the third control clutch C-3. Simultaneously, the rotation of the input shaft 15 is directly transferred to the carrier C3, C4 via the second control clutch C-2. As a result, the ring gear R3, R4 is rotated in accordance with the difference between the rotation of the first sun gear S3 and the rotation of the carrier C3, C4, thereby forwardly driving the output shaft 18 at a gear ratio of 0.892 of the tenth gear speed.

In the case of the eleventh forward gear speed, the second rotation control brake B-2 is actuated to restrict rotation of the large-diameter sun gear S1, so that the carrier C1, C2 is switched to the second reduced-speed rotation state. Furthermore, the third control clutch C-3 and the second control clutch C-2 are actuated to connect the carrier C1, C2 to the first sun gear S3 and connect the input shaft 15 to the carrier C3, C4. Therefore, rotation of the input shaft 15 is reduced in speed to the second reduced-speed rotation, by the ring gear R1, R2, the large-diameter sun gear S1 restricted in rotation and bearing reaction force, and the carrier C1, C2. The rotation is then transferred to the first sun gear S3 via the third control clutch C-3. Simultaneously, the rotation of the input shaft 15 is directly transferred to the carrier C3, C4 via the second control clutch C-2. As a result, the ring gear R3, R4 is rotated in accordance with the difference between the rotation of the first sun gear S3 and the rotation of the carrier C3, C4, thereby forwardly driving the output shaft 18 at a gear ratio of 0.833 of the eleventh gear speed.

In the case of the twelfth forward gear speed, the second control clutch C-2 is actuated to connect the input shaft 15 to the carrier C3, C4, and the first control brake B-3 is actuated to restrict rotation of the first sun gear S3. Therefore, rotation of the input shaft 15 is transferred to the carrier C3, C4 via the second control clutch C-2 to rotate the ring gear R3, R4 with the rotation-restricted first sun gear S3 bearing reaction force. As a result, the output shaft 18 is forwardly driven at a gear ratio of 0.686 of the twelfth gear speed.

In the case of the first reverse gear speed, the second rotation control brake B-2 is actuated to restrict rotation of the large-diameter sun gear S1, so that the carrier C1, C2 is switched to the first reduced-speed rotation state. Furthermore, the third control clutch C-3 is actuated to connect the carrier C1, C2 to the first sun gear S3, and the second control brake B-4 is actuated to restrict rotation of the carrier C1, C2. Therefore, rotation of the input shaft 15 is reduced in speed to the second reduced-speed rotation via the ring gear R1, R2, the large-diameter first sun gear S1, restricted in rotation and bearing reaction force, and the carrier C1, C2. The rotation is then transferred to the first sun gear S3 via the third control clutch C-3 so as to reversely rotate the ring gear R3, R4 with the rotation-restricted carrier C3, C4 bearing reaction force. As a result, the output shaft 18 is reversely driven at a gear ratio of 3.879 of the first reverse gear speed.

In the case of the second reverse gear speed, the first rotation control brake B-1 is actuated to restrict rotation of the small-diameter sun gear S2, so that the carrier C1, C2 is switched to the first reduced-speed rotation state. Furthermore, the third control clutch C-3 is actuated to connect the carrier C1, C2 to the first sun gear S3, and the second control brake B-4 is actuated to restrict rotation of the carrier C1, C2. Therefore, rotation of the input shaft 15 is reduced in speed to the first reduced-speed rotation via the ring gear R1, R2, the small-diameter sun gear S2 restricted in rotation and bearing reaction force, and the carrier C1, C2. The rotation is then transferred to the first sun gear S3 via the third control clutch C3 so as to reversely rotate the ring gear R3, R4 with the rotation-restricted carrier C3, C4 bearing reaction force. As a result, the output shaft 18 is reversely driven at a gear ratio of 2.970 of the second reverse gear speed.

As is apparent from the speed diagram of FIG. 3 indicating the rotation ratios of the large-diameter, small-diameter, first and second sun gears S1 to S4, the carrier C1, C2, the carrier C3, C4, the ring gear R1, R2 and the ring gear R3, R4 in the various gear speeds where the rotation speed of the ring gear R1, R2 of the speed-reducing dual planetary gear unit 16 connected to the input shaft 15 is defined as 1, the rotation ratios, that is, the gear ratios, of the common ring gear R3, R4 of the gear speeds are arranged at suitable intervals. According to the automatic transmission in accordance with the invention, it is possible to achieve twelve forward speeds and two reverse speeds that are suitably spaced. Furthermore, none of the sun gears, carriers or ring gears rotate at very high speeds in any of the forward or reverse speeds.

A second embodiment will next be described with reference to FIG. 4. The second embodiment is the same as the first embodiment in the speed-changing dual planetary gear unit 17, the first to third clutches C-1 to C-3, the first and second control brakes B-3, B4, the one-way clutch F-1, etc., which are represented by like reference characters in the drawings, and will not be described again. A speed-reducing dual planetary gear unit 60 that distinguishes the second embodiment from the first embodiment will only be described.

In the speed-reducing dual planetary gear unit 60, a sun gear S1 and a carrier C1 of a double-pinion type planetary gear mechanism 65 and a sun gear S2 and a carrier C2 of a single-pinion type planetary gear mechanism 66 are connected and integrated. Specifically, the speed-reducing dual planetary gear unit 60 includes a common sun gear S1, S2 rotatably supported on a common axis 13, long pinions 62 meshed with the sun gear S1, S2, a common carrier C1, C2 that rotatably supports the long pinions 62 and intermediate pinions 63 meshed with the long pinions 62 and that is rotatably supported on the common axis 13, and ring gears R2, R1 that mesh with the long pinions 62 and the intermediate pinions 63, respectively, and that are rotatably supported on the common axis 13. An input shaft 15 is connected to the ring gear R2, which precedes the ring gear R1 in the transfer path.

First and second rotation control brakes B-1, B-2 for connecting the common sun gear S1, S2 and the later-stage ring gear R1, respectively, to a transmission case 12 are connected to the sun gear S1, S2 and the ring gear R1, respectively. Therefore, the carrier C1, C2, as a reduced-speed rotation output member 55, is switched among a first reduced-speed rotation state in which the rotation of the sun gear S1, S2 is restricted by the first rotation control brake B-1 so that the carrier C1, C2 has a first reduced-speed rotation that is slower than the rotation of the input shaft 15, a second reduced-speed rotation state in which the rotation of the ring gear R1 is restricted by the second rotation control brake B-2 so that the carrier C1, C2 has a second reduced-speed rotation speed that is slower than the first reduced-speed rotation, and a free rotation state in which the first and second rotation control brakes B-1, B-2 are in a disengaged state so that rotation is not restricted.

The speed-reducing dual planetary gear unit 60 forms a speed-reducing gear unit 49 that is connected to the input shaft 15 and that generates the first and second reduced-speed rotations that are slower than the rotation of the input shaft 15. The first and second rotation control brakes B-1, B-2 form rotation state switching means 50 for switching the carrier C1, C2, as the reduced-speed rotation output member 55, among the reduced-speed rotation states and the free rotation state.

The second embodiment is substantially the same as the first embodiment, in that the rotation of the input shaft 15 and the first or second reduced-speed rotations generated on the carrier C1, C2 of the speed-reducing planetary gear unit 60 are transferred to the second and first sun gears S4, S3 and the common carrier C3, C4 of the speed-changing dual planetary gear unit 17 via the first to third control clutches C-1 to C-3, and that the first sun gear S3 and the carrier C3, C4 are selectively restricted in rotation by the first and second control brakes B-3, B-4 so as to shift the rotation of the input shaft 15 to twelve forward speeds and two reverse speeds. This feature will not be described in detail again. The states of operation of the control clutches and the control brakes for the gear speeds are shown in FIG. 5. In the second embodiment, the states of operation of the control brakes and the control clutches are interchanged between the second gear speed and the third gear speed and between the fourth gear speed and the fifth gear speed, in comparison with the first embodiment.

Figures 4, 5:
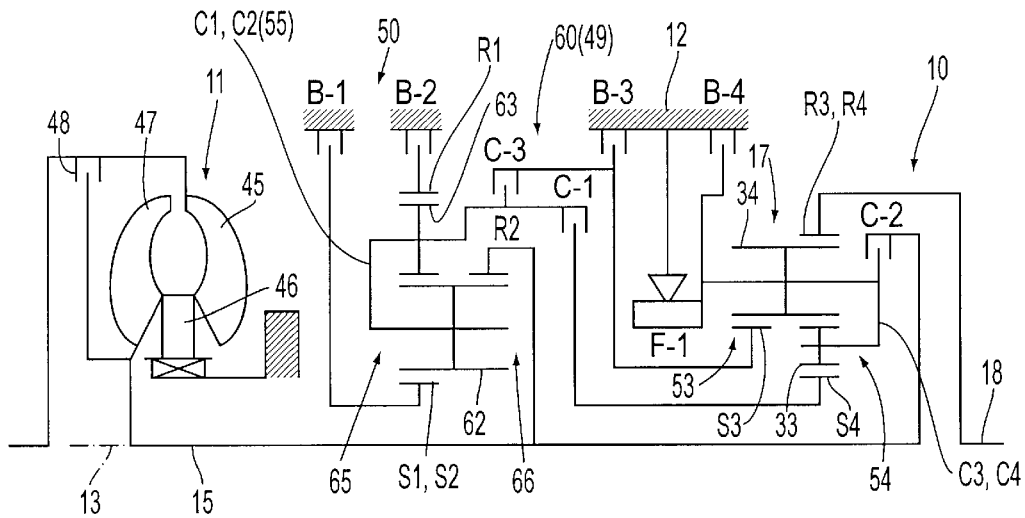
FIG. 4 is a skeleton diagram illustrating a second embodiment.
FIG. 5 is a table showing the states of operation of control brakes and control clutches for various gear speeds in the second embodiment.

FIG. 5 shows, in the column of gear ratio, the gear ratios (rotation speed of the input shaft 15/rotation speed of the output shaft 18) of the gear speeds achieved in a case where a speed-reducing planetary gear mechanism 65 formed by the sun gear S1, the long pinions 62, the intermediate pinions 63, the carrier CI and the ring gear R1 of the speed-reducing dual planetary gear unit 60 has a gear ratio $\lambda 1$ of 0.273, and a speed-reducing second planetary gear mechanism 66 formed by the sun gear S2, the long pinions 62, the carrier C2 and the ring gear R2 has a gear ratio $\lambda 2$ of 0.391, and a speed-changing first planetary gear mechanism 53 formed by a first sun gear S3, long pinions 34, a carrier C3 and a ring gear R3 of the speed-changing dual planetary gear unit 17 has a gear ratio $\lambda 3$ of 0.556, and a speed-changing second planetary gear mechanism 54 formed by a second sun gear S4, intermediate pinions 33, the long pinions 34, a carrier C4 and a ring gear R4 has a gear ratio $\lambda 4$ of 0.417.

Figure 6:
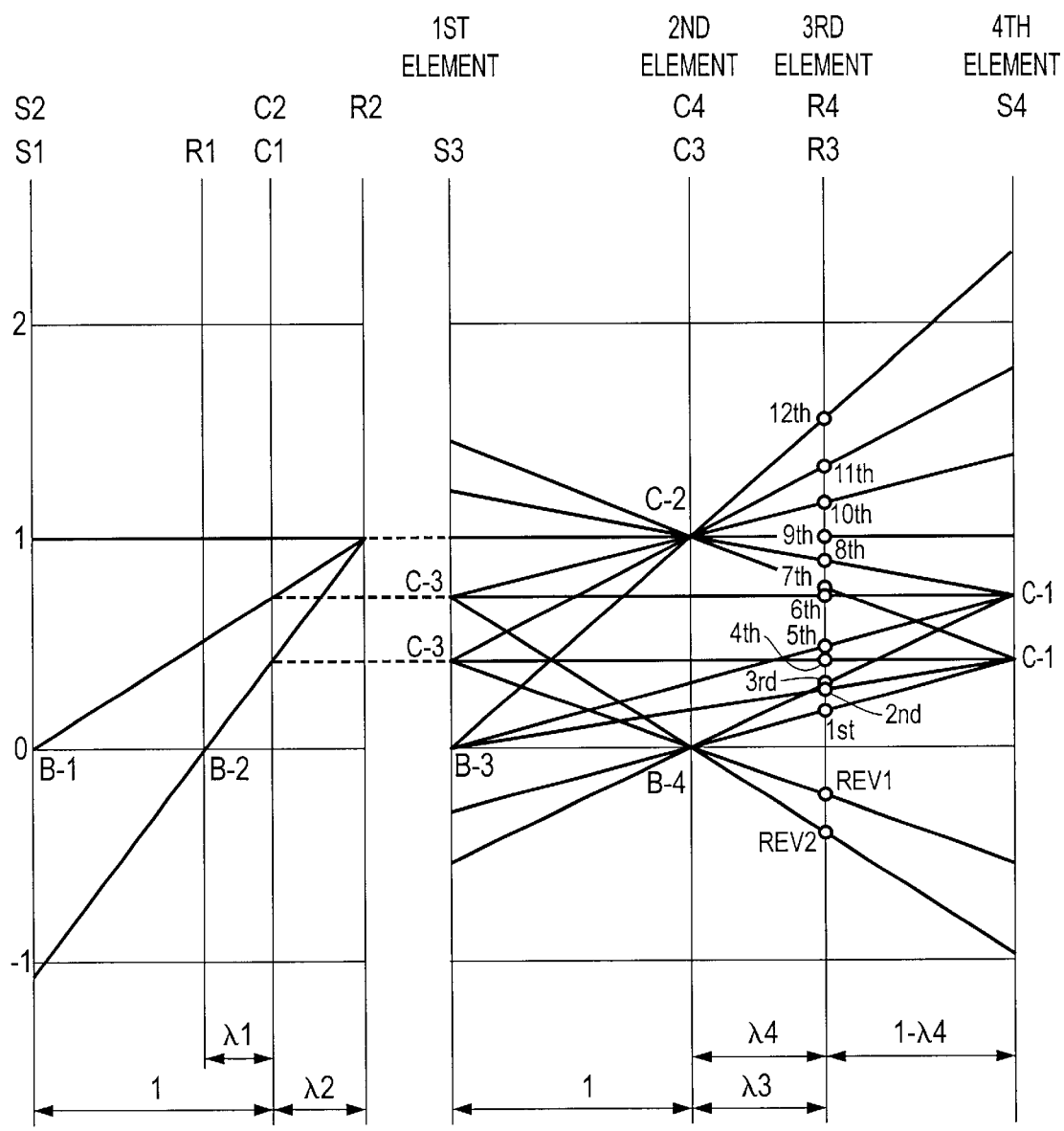
FIG. 6 is a speed diagram indicating the rotation ratios of various elements of a planetary gear unit at the gear speeds in the second embodiment.

The speed diagram of the second embodiment is shown in FIG. 6. In the second embodiment as well, the first sun gear S3 as the first element is connected to the third control clutch C-3 and the first control brake B-3, and the carrier C3, C4 as the second element is connected to the second control clutch C-2 and the second control brake B-4, and the ring gear R3, R4 as the third element is connected to the output shaft 18, and the second sun gear S4 as the fourth element is connected to the first control clutch C-1.

Figures 7, 8:
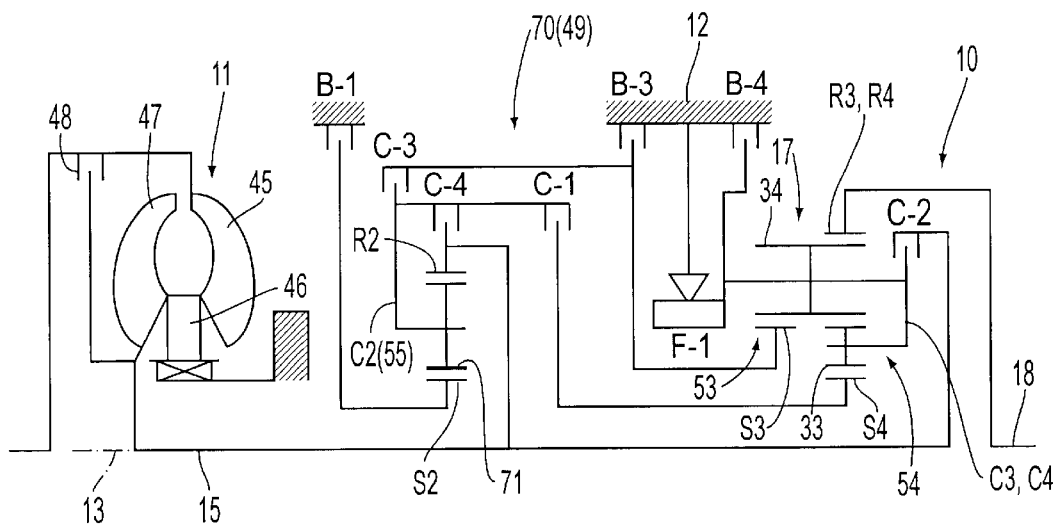
FIG. 7 is a skeleton diagram illustrating a third embodiment.
FIG. 8 is a table showing the states of operation of control brakes and control clutches for various gear speeds in the third embodiment.

An embodiment in which a single-type planetary gear unit is employed for a speed-reducing gear unit will next be described. A third embodiment is the same as the first embodiment in the speed-changing dual planetary gear unit 17, the first to third clutches C-1 to C-3, the first and second control brakes B-3, B-4, the one-way clutch F-1, etc., which are represented in FIG. 7 by comparable reference characters and will not be described again. A speed-reducing planetary gear unit 70 and a connection relationship between the speed-reducing planetary gear unit 70 and the speed-changing dual planetary gear unit 17 will only be described below.

The speed-reducing planetary gear unit 70 includes a sun gear S2 rotatably supported on a common axis 13, pinions 71 meshed with the sun gear S2, a carrier C2 that rotatably supports the pinions 71 and that is rotatably supported on the common axis 13, and a ring gear R2 that meshes with the pinions 71 and that is rotatably supported on the common axis 13. An input shaft 15 is connected to the ring gear R2. A rotation control clutch C-4 is designed to selectively connect the carrier C2 to the ring gear R2. A rotation control brake B2 is designed to selectively restrict rotation of the sun gear S2. Therefore, the carrier C2 as a reduced-speed rotation output member 55 is switched among an input rotation state in which the carrier C2 is connected to the ring gear R2 by the rotation control clutch C-4 so as to be rotated at the same rotation speed as the input rotation speed of the input shaft 15, a reduced-speed rotation state in which rotation of the sun gear S2 is restricted by the rotation control brake B-2 so as to have a reduced-speed rotation that is slower than the rotation of the input shaft 15, and a free rotation state in which the rotation control clutch C-4 and the rotation control brake B-2 remain un-actuated so that rotation is not restricted.

The speed-reducing planetary gear unit 70 forms a speed-reducing gear unit 49 that is connected to the input shaft 15 and that generates the input rotation that is equal in speed to the rotation of the input shaft 15 and the reduced-speed rotation that is slower than the rotation of the input shaft 15. The rotation control clutch C-4 and the rotation control brake B-2 form rotation state switching means 50 for switching the carrier C2, as the reduced-speed rotation output member 55, between the reduced-speed rotation state and the free rotation state.

The third embodiment, constructed as described above, is able to achieve gear ratios of nine forward speeds and two reverse speeds by selectively engaging and disengaging the first to third control clutches C-1 to C-3 and the rotation control clutch C-4 and selectively actuating the first and second control brakes B-3, B-4 and the rotation control brake B-2 so as to restrict rotations of element members of the planetary gear unit.

The states of operation of the control clutches and the control brakes for the gear speeds are shown in FIG. 8. FIG. 8 shows, in the column of gear ratio, the gear ratios (rotation speed of the input shaft 15/rotation speed of the output shaft 18) of the gear speeds achieved in a case where the speed-reducing planetary gear unit 70 has a gear ratio $\lambda 2$ of 0.417, and a speed-changing first planetary gear mechanism 53 formed by the first sun gear S3, the long pinions 34, the carrier C3 and the ring gear R3 of the speed-changing dual planetary gear unit 17 has a gear ratio λ4 of 0.458, and a speed-changing second planetary gear mechanism 54 formed by the second sun gear S4, the intermediate pinions 33, the long pinions 34, the carrier C4 and the ring gear R4 has a gear ratio λ4 of 0.375.

Figure 9:
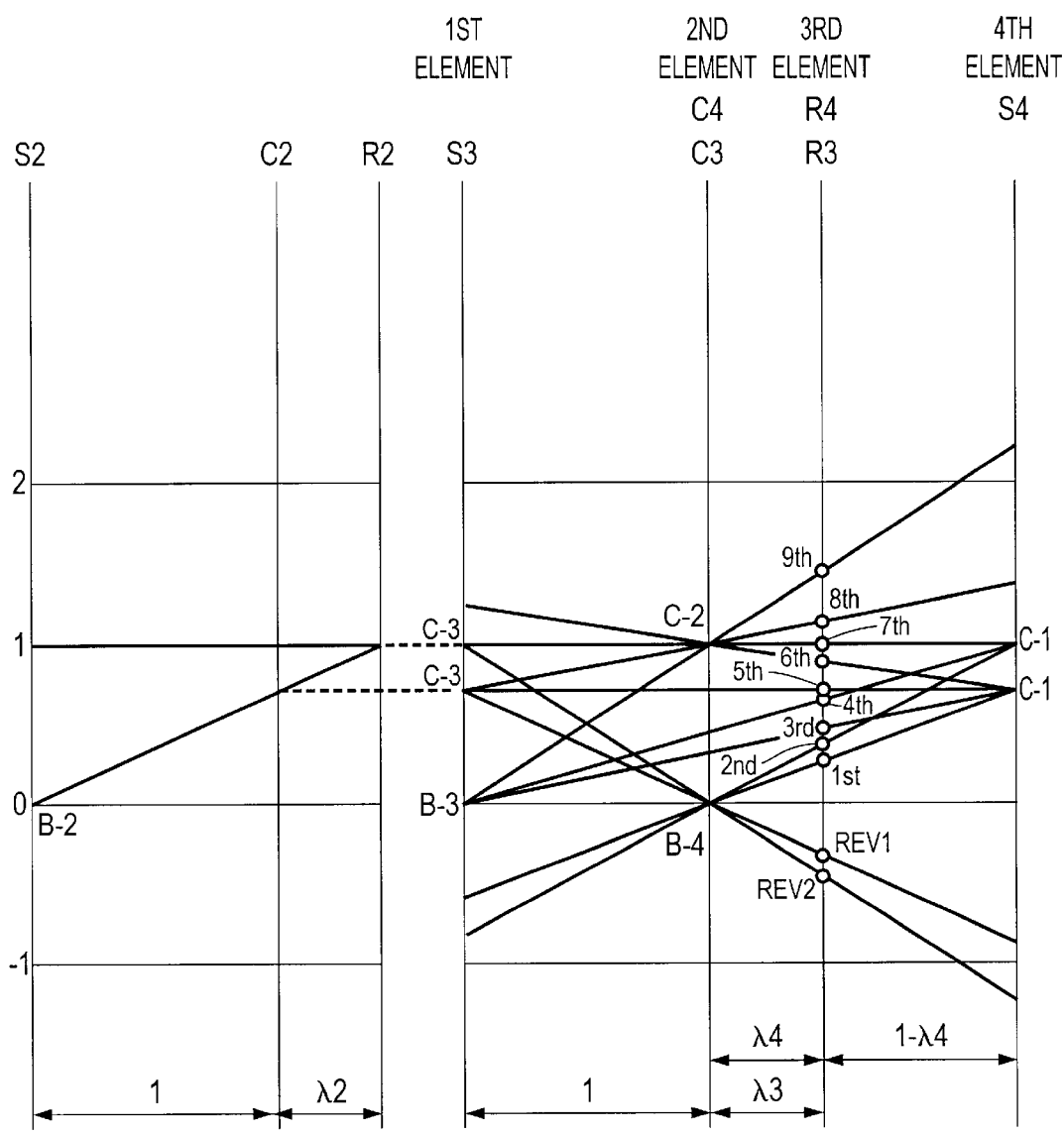
FIG. 9 is a speed diagram indicating the rotation ratios of various elements of a planetary gear unit at the gear speeds in the third embodiment.

The speed diagram of the third embodiment is shown in FIG. 9. In the third embodiment as well, the first sun gear S3 as the first element is connected to the third control clutch C-3 and the first control brake B-3, the carrier C3, C4, as the second element, is connected to the second control clutch C-2 and the second control brake B-4, the ring gear R3, R4, as the third element, is connected to the output shaft 18, and the second sun gear S4, as the fourth element, is connected to the first control clutch C-1.

Operations at the gear speeds will be described. In the case of the first forward gear speed, the rotation control brake B-2, forming the rotation state switching means 50, is actuated to restrict rotation of the sun gear S2, so that the carrier C2 as the reduced-speed rotation output member 55 is switched to the reduced-speed rotation state. Furthermore, the first control clutch C-1 is actuated to connect the carrier C2 to the second sun gear S4, and the one-way clutch F-1 is actuated to restrict reverse rotation of the carrier C3, C4. Therefore, rotation of the input shaft 15 is reduced in speed to the reduced-speed rotation via the ring gear R2, the sun gear S2, restricted in rotation so as to bear reaction force, and the carrier C2. The rotation is then transferred to the ring gear R3, R4 via the first control clutch C-1, the second sun gear S4, and the carrier C3, C4 whose reverse rotation is restricted by the one-way clutch F-I so as to bear reaction force, thereby forwardly driving the output shaft 18 at a gear ratio of 3.778 of the first gear speed. It is also possible to restrict rotation of the carrier C3, C4 by actuating the second control brake B-4.

In the case of the second forward gear speed, the rotation control clutch C-4, forming the rotation state switching means 50, is actuated to connect the carrier C2 to the ring gear R2, so that the carrier C2 is switched to the input rotation state in which the carrier C2 rotates together with the input shaft 15. Furthermore, the first control clutch C-1 is actuated to connect the carrier C2 to the second sun gear S4, and the one-way clutch F-1 is actuated to restrict reverse rotation of the carrier C3, C4. Therefore, rotation inputted to the input shaft 15 is directly transferred as the input rotation to the carrier C2 via the rotation control clutch C-4. The rotation is then transferred to the ring gear R3, R4 via the first control clutch C-1, the second sun gear S4, and the carrier C3, C4 whose reverse rotation is restricted by the one-way clutch F-1 so as to bear reaction force, thereby forwardly driving the output shaft 18 at a gear ratio of 2.667 of the second gear speed.

In the case of the third forward gear speed, the rotation control brake B-2 is actuated to restrict rotation of the sun gear S2, so that the carrier C2 is switched to the reduced-speed rotation state. Furthermore, the first control clutch C-1 is actuated to connect the carrier C2 to the second sun gear S4, and the first control brake B-3 is actuated to restrict rotation of the first sun gear S3. Therefore, rotation of the input shaft 15 is reduced in speed to the reduced-speed rotation via the ring gear R2, the sun gear S2 restricted in rotation so as to bear reaction force, and the carrier C2. The rotation is then transferred to the ring gear R3, R4 via the first control clutch C-1, the second sun gear S4, the first sun gear S3 whose rotation is restricted so as to bear reaction force, and the carrier C3, C4, thereby forwardly driving the output shaft 18 at a gear ratio of 2.159 of the third gear speed.

In the case of the fourth forward gear speed, the rotation control clutch C-4 is actuated to connect the carrier C2 to the ring gear R2, so that the carrier C2 is switched to the input rotation state in which the carrier C2 rotates together with the input shaft 15. Furthermore, the first control clutch C-1 is actuated to connect the carrier C2 to the second sun gear S4, and the first control brake B-3 is actuated to restrict rotation of the first sun gear S3. Therefore, rotation of the input shaft 15 is directly transferred as the input rotation to the carrier C2. The rotation is then transferred to the ring gear R3, R4 via the first control clutch C-1, the second sun gear S4, the first sun gear S3 whose rotation is restricted so as to bear reaction force, and the carrier C3, C4, thereby forwardly driving the output shaft 18 at a gear ratio of 1.524 of the fourth gear speed.

In the case of the fifth forward gear speed, the rotation control brake B-2 is actuated to restrict rotation of the sun gear S2, so that the carrier C2 is switched to the reduced-speed rotation state. Furthermore, the first and third control clutches C-1, C-3 are actuated to connect the carrier C2 to the second sun gear S4 and to the first sun gear S3, respectively. Therefore, rotation of the input shaft 15 is reduced in speed to the reduced-speed rotation via the ring gear R2, the sun gear S2, restricted in rotation so as to bear reaction force, and the carrier C2. The rotation is then transferred to the second and first sun gears S4, S3 via the first and third control clutches C-1, C-3, so that the ring gear R3, R4 is rotated via the carrier C3, C4 in accordance with the rotation of the first and second sun gears S3, S4. As a result, the output shaft 18 is forwardly rotated at a gear ratio of 1.417 of the fifth gear speed.

In the case of the sixth forward gear speed, the rotation control brake B-2 is actuated to restrict rotation of the sun gear S2, so that the carrier C2 is switched to the reduced-speed rotation state. Furthermore, the first and second control clutches C-1, C-2 are actuated to connect the carrier C2 to the second sun gear S4 and connect the input shaft 15 to the carrier C3, C4. Therefore, rotation of the input shaft 15 is reduced in speed to the reduced-speed rotation via the ring gear R2, the sun gear S2, restricted in rotation so as to bear reaction force, and the carrier C2. The rotation is then transferred to the second sun gear S4 via the first control clutch C-1. Simultaneously, the rotation of the input shaft 15 is directly transferred to the carrier C3, C4 via the second control clutch C-2. Hence, the ring gear R3, R4 is rotated in accordance with the difference between the rotation of the second sun gear S4 and the rotation of the carrier C3, C4. As a result, the output shaft 18 is forwardly rotated at a gear ratio of 1.124 of the sixth gear speed.

In the case of the seventh forward gear speed, the first, second and third control clutches C-1, C-2, C-3 are connected so that the first and second sun gears S3, S4 are connected via the carrier C2 as the reduced-speed rotation output member 55. Furthermore, the rotation control clutch C-4 and the rotation control brake B-4, which are the rotation state switching means 50, are left un-actuated state, so that the carrier C2 is in the free rotation state. Therefore, rotation inputted to the input shaft 15 is directly transferred to the carrier C3, C4 of the speed-changing dual planetary gear unit 17 via the control clutch C-2, so as to rotate the ring gear R3, R4 via the interlocked first and second sun gears S3, S4. As a result, the output shaft 18 is forwardly driven at a gear ratio of 1.000 of the seventh gear speed.

In the case of the eighth forward gear speed, the rotation control brake B-2 is actuated to restrict rotation of the sun gear S2, so that the carrier C2 is switched to the reduced-speed rotation state. Furthermore, the third control clutch C-3 and the second control clutch C-2 are actuated to connect the carrier C2 to the first sun gear S3 and connect the input shaft 15 to the carrier C3, C4, respectively. Therefore, rotation of the input shaft 15 is reduced in speed via the ring gear R2, the sun gear S2, restricted in rotation so as to bear reaction force, and the carrier C2. The rotation is then transferred to the first sun gear S3 via the third control clutch C-3. Simultaneously, the rotation of the input shaft 15 is directly transferred to the carrier C3, C4 via the second control clutch C-2. Hence, the ring gear R3, R4 is rotated in accordance with the difference between the rotation of the first sun gear S3 and the rotation of the carrier C3, C4. As a result, the output shaft 18 is forwardly driven at a gear ratio of 0.881 of the eighth gear speed.

In the case of the ninth forward gear speed, the second control clutch C-2 is actuated to connect the input shaft 15 to the carrier C3, C4, and the first control brake B-3 is actuated to restrict rotation of the first sun gear S3. Therefore, rotation of the input shaft 15 is transferred to the carrier C3, C4 via the second control clutch C-2, so as to rotate the ring gear R3, R4 with the first sun gear S3 bearing reaction force. As a result, the output shaft 18 is forwardly driven at a gear ratio of 0.686 of the ninth gear speed.

In the case of the first reverse gear speed, the rotation control brake B-2 is actuated to restrict rotation of the second sun gear S2, so that the carrier C2 is switched to the reduced-speed rotation state. Furthermore, the third control clutch C-3 is actuated to connect the carrier C2 to the first sun gear S3, and the second control brake B-4 is actuated to restrict rotation of the carrier C3, C4. Therefore, rotation of the input shaft 15 is reduced in speed to the reduced-speed rotation via the ring gear R2, the second sun gear S2, restricted in rotation so as to bear reaction force, and the carrier C2. The rotation is transferred to the first sun gear S3 via the third control clutch C-3. The ring gear R3, R4 is reversely rotated with the rotation-restricted carrier C3, C4 bearing reaction force. As a result, the output shaft 18 is reversely driven at a gear ratio of 3.091 of the first reverse gear speed.

In the case of the second reverse gear speed, the rotation control clutch C-4 is actuated to connect the carrier C2 to the ring gear R2, so that the carrier C2 is switched to the input rotation state in which the carrier C2 rotates together with the input shaft 15. Furthermore, the third control clutch C-3 is actuated to connect the carrier C2 to the first sun gear S3, and the second control brake B-4 is actuated to restrict rotation of the carrier C3, C4. Therefore, rotation of the input shaft 15 is directly transferred to the carrier C2, and is then transferred to the first sun gear S3 via the third control clutch C-3. The ring gear R3, R4 is reversely rotated with the rotation-restricted carrier C3, C4 bearing reaction force. As a result, the output shaft 18 is reversely driven at a gear ratio of 2.182 of the second reverse gear speed.

Figure 10:
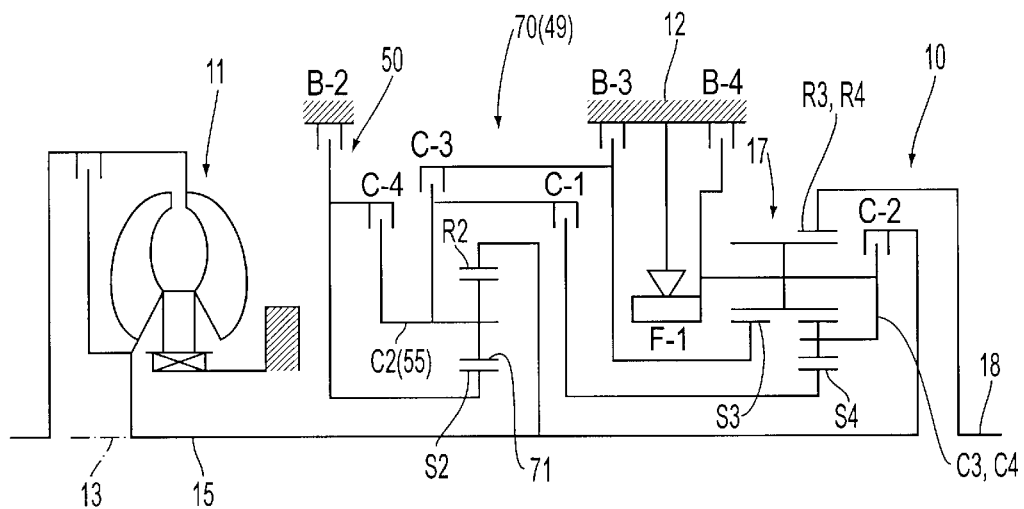
FIG. 10 is a diagram illustrating that a first rotation control clutch is connected between a sun gear and a carrier of a speed-reducing planetary gear unit.
Figure 11:
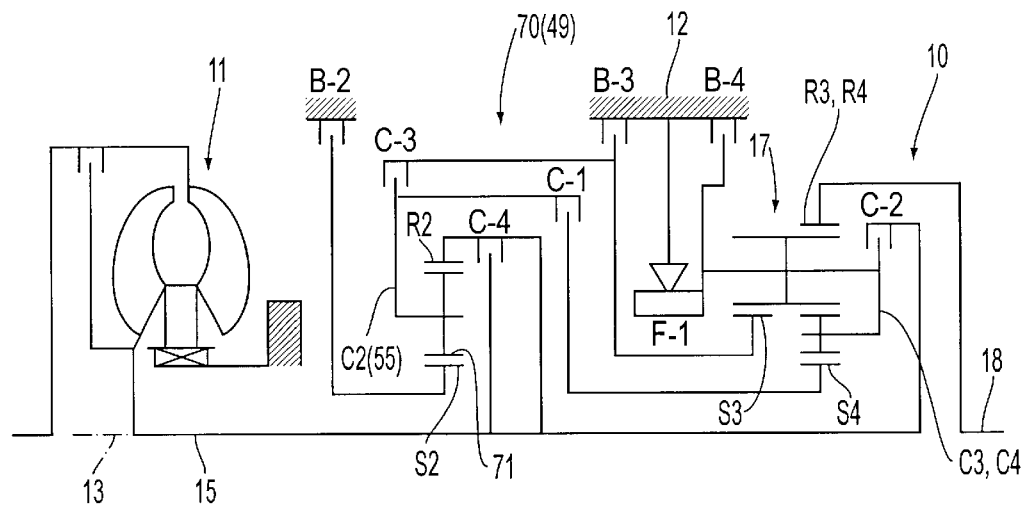
FIG. 11 is another diagram illustrating that a first rotation control clutch is connected between a sun gear and a carrier of a speed-reducing planetary gear unit.

In the third embodiment, the carrier C2 of the speed-reducing planetary gear unit 70 is caused to have the reduced-speed rotation that is slower than the rotation of the input shaft 15 by restricting rotation of the second sun gear S2 through the use of the rotation control brake B-2. Furthermore, the carrier C2 is caused to have the input rotation equal in speed to the rotation of the input shaft 15 by connecting the carrier C2 to the ring gear R2 via the rotation control clutch C-4. However, it is also possible to cause the reduced-speed rotation of the carrier C2 by restricting rotation of the sun gear S2 in the same manner and to cause the input rotation of the carrier C2 by selectively connecting the carrier C2 and the sun gear S2 or connecting the ring gear R2 and the sun gear S2 through the use of the rotation control clutch C-4 as indicated in FIGS. 10 and 11. In this case, the speed diagram of the speed-changing dual planetary gear unit 17 and the states of operation of the control brakes and the control clutches for the gear speeds are the same as in the third embodiment.

Figure 12:
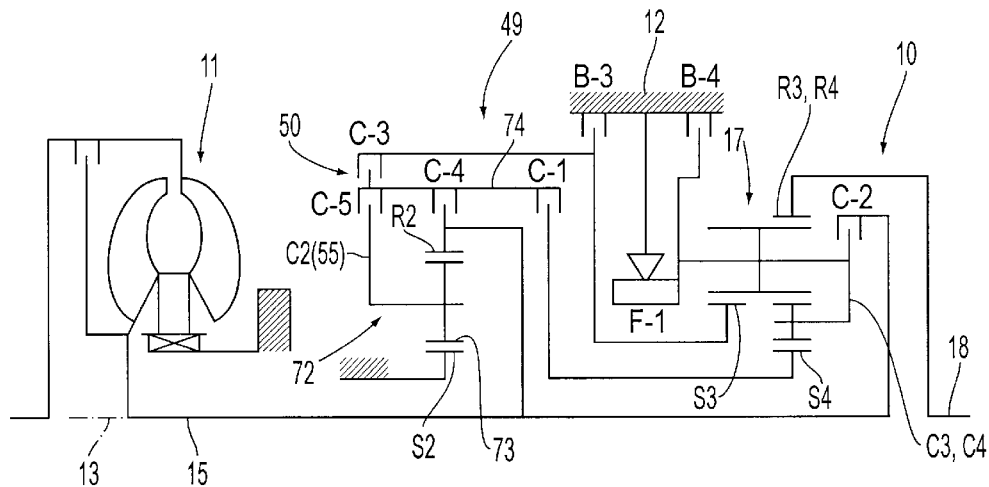
FIG. 12 is a skeleton diagram illustrating a fourth embodiment.

Fourth and fifth embodiments employing a single-type planetary gear unit in which rotation of a sun gear is restricted as a speed-reducing planetary gear unit will be described with reference to FIGS. 12 and 13. In FIG. 12, a speed-reducing planetary gear unit 72 includes a sun gear S2 restricted in rotation, a carrier C2 supporting pinions 73 meshed with the sun gear S2, and a ring gear R2 meshed with the pinions 73. An input shaft 15 is connected to the ring gear R2. Therefore, the carrier C2 is caused to have a second rotation that is slower than the rotation of the input shaft 15, and the ring gear R2 is caused to have a first rotation that is equal in speed to the rotation of the input shaft 15.

A connecting member 74 is disposed rotatably on a common axis 13. The connecting member 74 is detachably connected to second and first sun gears S4, S3 by first and third control clutches C-1, C-3, and is detachably connected to the ring gear R2 and the carrier C2 by first and second rotation control clutches C-4, C-5. Therefore, the connecting member 74, as a reduced-speed rotation output member 55, is switched among an input rotation state in which the connecting member 74 is connected to the ring gear R2 via the first rotation control clutch C-4 so that the connecting member 74 is rotated at an input rotation equal in speed to the rotation of the input shaft 15, a reduced-speed rotation state in which the connecting member 74 is connected to the carrier C2 via the second rotation control clutch C5 so that the connecting member 74 is rotated at a reduced-speed rotation that is slower than the rotation of the input shaft 15, and a free rotation state in which the first and second rotation control clutches C-4, C-5 remain disengaged so that the connecting member 74 is not restricted in rotation.

The speed-reducing planetary gear unit 72 and the connecting member 74 form a speed-reducing gear unit 49 that is connected to the input shaft 15 and that generates the input rotation equal in speed to the rotation of the input shaft 15 and that generates the reduced-speed rotation that is slower than the rotation of the input shaft 15. The first and second rotation control clutches C-4, C-5 form rotation state switching means 50 for switching the connecting member 74 as the reduced-speed rotation output member 55 between the reduced-speed rotation state and the free rotation state.

The states of operation of the control brakes and the control clutches for the gear speeds are substantially the same as in the third embodiment if the second rotation control clutch C-5 replaces the second rotation control brake B-2. The speed diagram of the speed-changing dual planetary gear unit 17 is the same as in the third embodiment.

Figure 13:
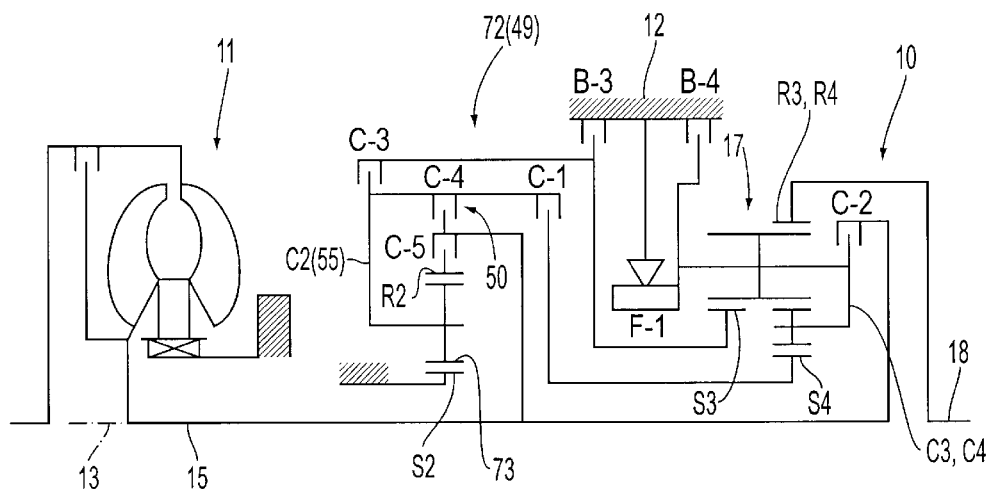
FIG. 13 is a skeleton diagram illustrating a fifth embodiment.

In FIG. 13, a speed-reducing planetary gear unit 72 includes a sun gear S2 restricted in rotation, a carrier C2 supporting pinions 73 meshed with the sun gear S2, and a ring gear R2 meshed with the pinions 73. A first control clutch C-1 is provided between the carrier C2 and a second sun gear S4. A second control clutch C-3 is provided between the carrier C2 and a first sun gear S3. A first rotation control clutch C-4 is provided between an input shaft 15 and the carrier C2. A second rotation control clutch C-5 is provided between the input shaft 15 and the ring gear R2. Therefore, the carrier C2, as a reduced-speed rotation output member 55, is switched among an input rotation state in which the carrier C2 is connected to the input shaft 15 via the first rotation control clutch C-4 so that the carrier C2 rotates at an input rotation equal in speed to the rotation of the input shaft 15, a reduced-speed rotation state in which the input shaft 15 is connected to the ring gear R2 via the second rotation control clutch C-5 so that the carrier C2 rotates slower than the input shaft 15, and a free rotation state in which the first and second rotation control clutches C-4, C-5 remain disengaged so that rotation of the carrier C2 is not restricted.

The speed-reducing planetary gear unit 72 forms a speed-reducing gear unit 49 that is connected to the input shaft 15 and that generates a first rotation equal in speed to the rotation of the input shaft 15 and that generates a reduced-speed rotation that is slower than the rotation of the input shaft 15. The first and second rotation control clutches C-4, C-5 form rotation state switching means 50 for switching the carrier C2 as the reduced-speed rotation output member 55 between the reduced-speed rotation state and the free rotation state. In this case, the states of operation of the control brakes and the control clutches for the gear speeds are substantially the same as in the third embodiment if the second rotation control clutch C-5 replaces the second rotation control brake B-2. The speed diagram of the speed-changing dual planetary gear unit 17 is the same as in the third embodiment.

Next described will be other embodiments that employ a single-type planetary gear unit as a speed-reducing gear unit. A sixth embodiment has a construction that can be obtained by removing the rotation control clutch C-4 from the construction of the third embodiment. Components corresponding to those of the third embodiment are represented by comparable reference characters in FIG. 14, and will not be described in detail again. In this case, a carrier C2 as a reduced-speed rotation output member 55 is switched between a reduced-speed rotation state in which a sun gear S2 is restricted in rotation by a rotation control brake B-2 so that the carrier C2 rotates at a reduced-speed rotation that is slower than the rotation of an input shaft 15, and a free rotation state in which the rotation control brake B-2 remains disengaged so that the carrier C2 is not restricted in rotation.

The speed-reducing planetary gear unit 70 forms a speed-reducing gear unit 49 that is connected to the input shaft 15 and that generates a first rotation equal in speed to the rotation of the input shaft 15 and that generates a reduced-speed rotation that is slower than the rotation of the input shaft 15. The first and second rotation control clutches C-4, C-5 form rotation state switching means 50 for switching the carrier C2 as the reduced-speed rotation output member 55 between the reduced-speed rotation state and the free rotation state.

Figures 14, 15:
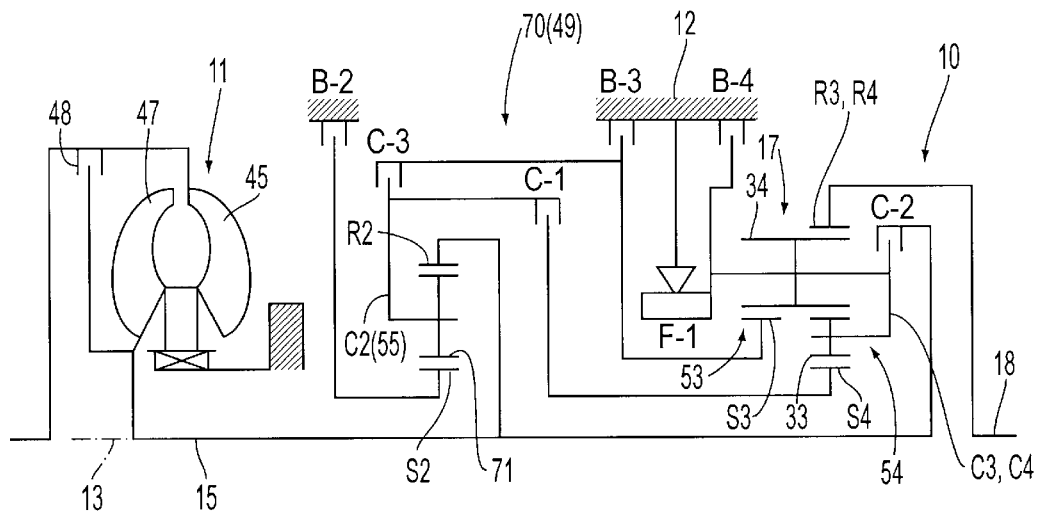
FIG. 14 is a skeleton diagram illustrating a sixth embodiment.
FIG. 15 is a table showing the states of operation of control brakes and control clutches for various gear speeds in the sixth embodiment.

The states of operation of the control clutches and the control brakes for the gear speeds shown in FIG. 15 are equivalent to states thereof shown by a table obtained by eliminating from the table of FIG. 8 the rows of the gear speeds of 2nd, 4th and Rev2 in which the rotation control clutch C-4 is actuated and by renumbering the remaining rows of gear speeds sequentially from the top. The operations of the speed-reducing planetary gear unit 70 and the speed-changing dual planetary gear unit 17 for the gear speeds are substantially the same as those for the corresponding gear speeds in the third embodiment, except for the gear ratios of the gear speeds. With regard to these points, description will be omitted. The column of gear ratios in FIG. 15 shows gear ratios of the gear speeds achieved in a case where the speed-reducing planetary gear unit 70 has a gear ratio $\lambda 2$ of 0.556; a speed-changing first planetary gear mechanism 53 formed by a first sun gear S3, long pinions 34, a carrier C3 and a ring gear R3 of the speed-changing dual planetary gear unit 17 has a gear ratio $\lambda 3$ of 0.458; and a speed-changing second planetary gear mechanism 54 formed by a second sun gear S4, intermediate pinions 33, the long pinions 34, a carrier C4 and a ring gear R4 of the speed-changing dual planetary gear unit 17 has a gear ratio $\lambda 4$ of 0.375.

Figure 16:
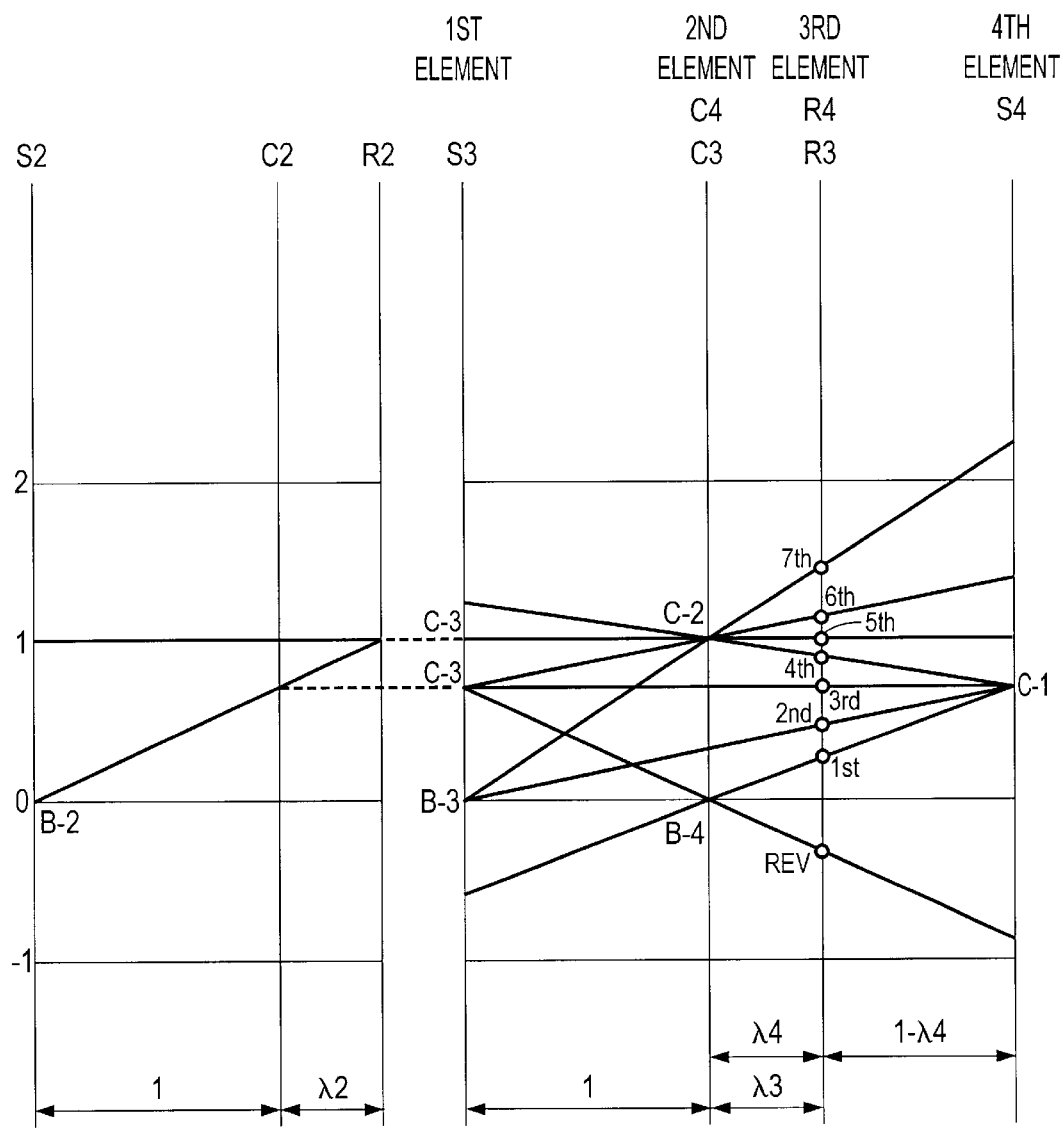
FIG. 16 is a speed diagram indicating the rotation ratios of various elements of a planetary gear unit at the gear speeds in the sixth embodiment.

A speed diagram of the sixth embodiment is shown in FIG. 16. In the sixth embodiment as well, the first sun gear S3 as the first element is connected to the third control clutch C-3 and the first control brake B-3, and the carrier C3, C4 as the second element is connected to the second control clutch C-2 and the second control brake B-4, and the ring gear R3, R4 as the third element is connected to the output shaft 18, and the second sun gear S4 as the fourth element is connected to the first control clutch C-1.

Figure 17:
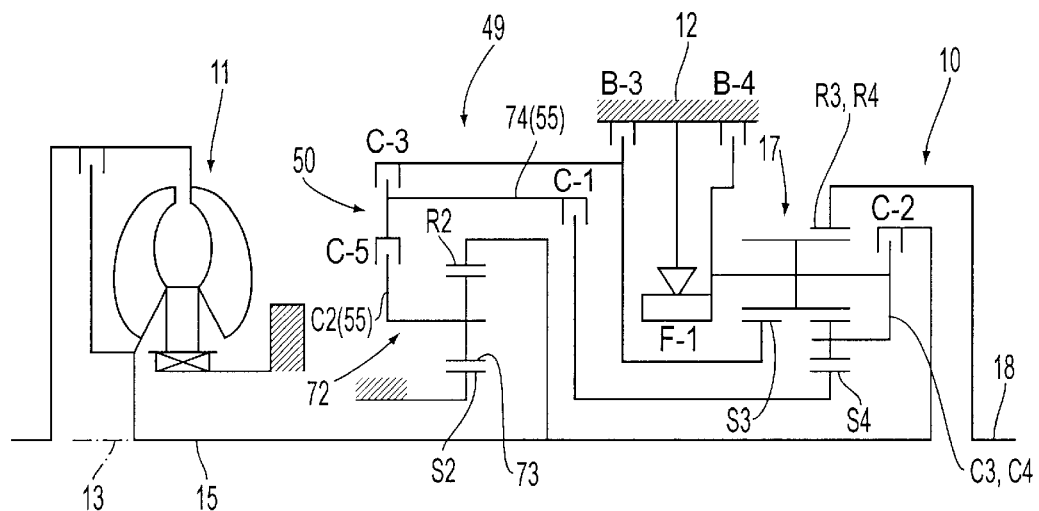
FIG. 17 is a skeleton diagram illustrating a seventh embodiment.
Figure 18:
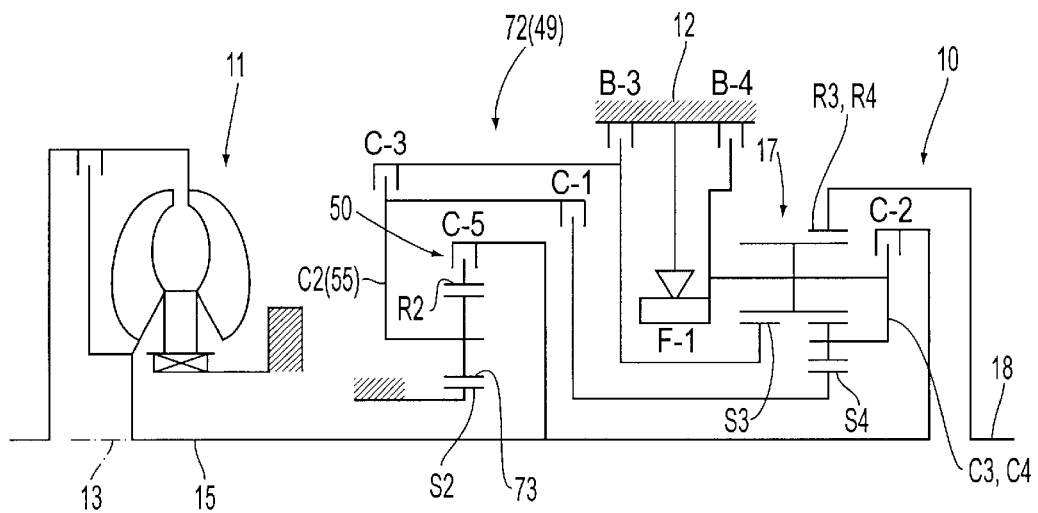
FIG. 18 is a skeleton diagram illustrating an eighth embodiment.

Seventh and eighth embodiments employing a single-type planetary gear unit in which rotation of a sun gear is restricted as a speed-reducing planetary gear unit will next be described with reference to FIGS. 17 and 18. The seventh embodiment has a construction equivalent to a construction obtained by removing the first rotation control clutch C-4 from the construction of the fourth embodiment. Components of the seventh embodiment corresponding to those of the fourth embodiment are represented by comparable reference characters in FIG. 17, and will not be described in detail again. In this case, a connecting member 74, as a reduced-speed rotation output member 55, is switched between a reduced-speed rotation state in which the connecting member 74 is connected to a carrier C2 via a rotation control clutch C-5 so that the connecting member 74 is rotated at a reduced-speed rotation that is slower than the rotation of an input shaft 15, and a free rotation state in which the rotation control clutch C-5 remains disengaged so that the connecting member 74 is not restricted in rotation.

The speed-reducing planetary gear unit 72 and the connecting member 74 form a speed-reducing gear unit 49 that is connected to the input shaft 15 and that generates the reduced-speed rotation that is slower than the rotation of the input shaft 15. The rotation control clutch C-5 forms rotation state switching means 50 for switching the connecting member 74, as the reduced-speed rotation output member 55, between the reduced-speed rotation state and the free rotation state. The states of operation of the control brakes and the control clutches for the gear speeds are substantially the same as in the sixth embodiment if the rotation control clutch C-5 is operated instead of the rotation control brake B-2. The speed diagram of the speed-changing dual planetary gear unit 17 is the same as in the sixth embodiment.

The eighth embodiment has a construction obtained by removing the first rotation control clutch C-4 from the construction of the fifth embodiment. Components of the eighth embodiment corresponding to those of the fifth embodiment are represented by comparable reference characters in FIG. 18, and will not be described in detail again. In this case, a carrier C2, as a reduced-speed rotation output member 55, is switched between a reduced-speed rotation state in which the ring gear R2 is connected to an input shaft 15 via a rotation control clutch C-5 so that the carrier C2 is rotated slower than an input shaft 15, and a free rotation state in which the rotation control clutch C-5 remains disengaged so that the carrier C2 is not restricted in rotation.

The speed-reducing planetary gear unit 72 forms a speed-reducing gear unit 49 that is connected to the input shaft 15 and that generates the reduced-speed rotation that is slower than the rotation of the input shaft 15. The rotation control clutch C-5 forms rotation state switching means 50 for switching the carrier C2, as the reduced-speed rotation output member 55, between the reduced-speed rotation state and the free rotation state. The states of operation of the control clutches and the control brakes for the gear speeds are substantially the same as in the sixth embodiment if the rotation control clutch C-5 is operated instead of the rotation control brake B-2. The speed diagram of the speed-changing dual planetary gear unit 17 is the same as in the sixth embodiment.

Figure 19:
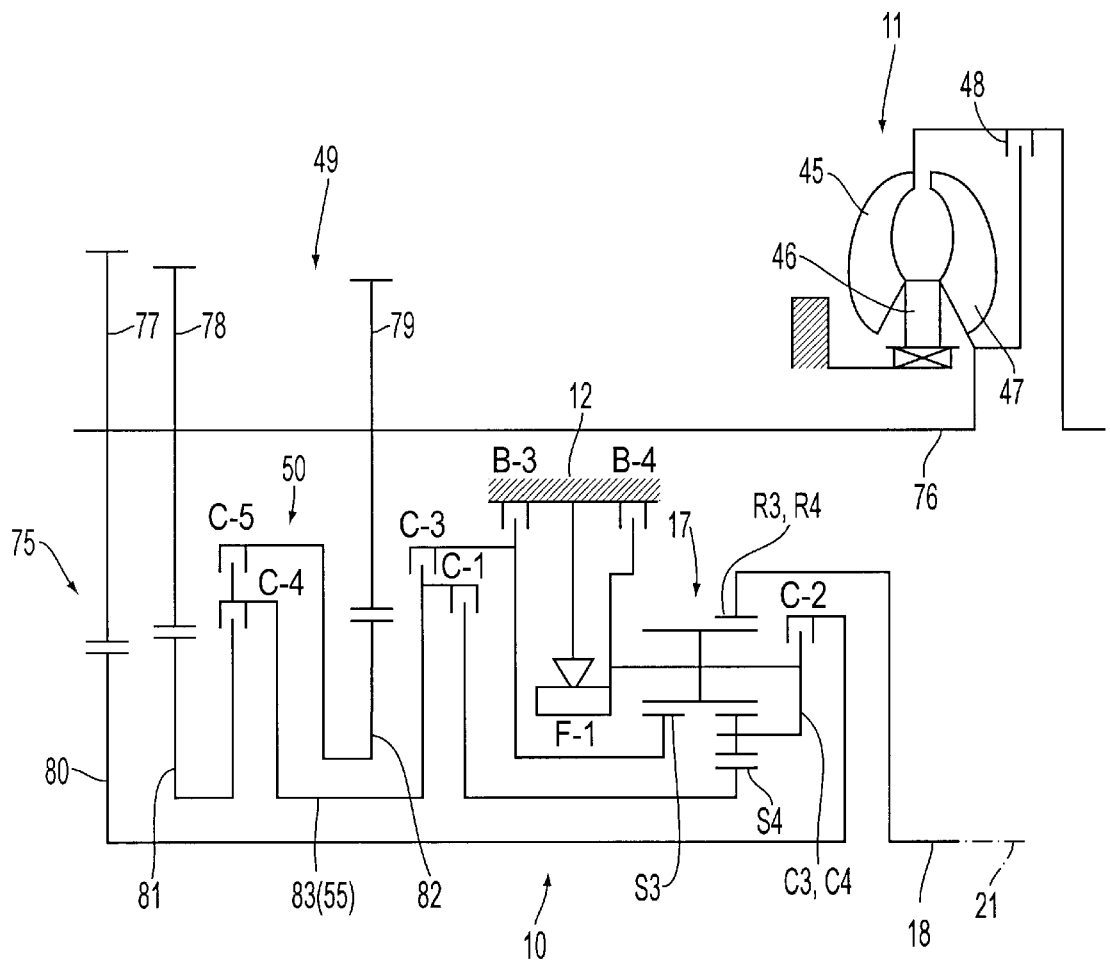
FIG. 19 is a skeleton diagram illustrating a ninth embodiment.

Next described will be a ninth embodiment in which the speed-reducing gear unit 49 is formed by a speed-reducing gear train. The ninth embodiment is substantially the same as the first embodiment, with respect to the speed-changing dual planetary gear unit 17, the first to third control clutches C-1 to C-3, the first and second control brakes B-3, B-4, the one-way clutch F-1, etc., which are represented in comparable reference characters in FIG. 19, and will not be described below. A speed-reducing gear train 75 and a connection relationship between the speed-reducing gear train 75 and the speed-changing dual planetary gear unit 17 that distinguish the ninth embodiment from the first embodiment will be described. A turbine 47 of a fluid torque converter 11 is connected to an input shaft 76 that is rotatably supported by a transmission case 12 of an automatic transmission 10. A large-diameter gear 77, an intermediate-diameter gear 78 and a small-diameter gear 79 are fixed to the input shaft 76. A first gear 80 that has a diameter equal to that of the large-diameter gear 77 and that meshes with the large-diameter gear 77 is rotatably supported on an axis 21 of a speed-changing dual planetary gear unit 17. A second gear 81 and a third gear 82 that mesh with the intermediate-diameter gear 78 and the small-diameter gear 79, respectively, are rotatably supported on the axis 21. Therefore, the first gear 80 rotates at an input rotation equal in speed to the rotation of the input shaft 76. The second gear 81 rotates at a first reduced-speed rotation that is slower than the rotation of the input shaft 76. The third gear 82 rotates at a second reduced-speed rotation that is slower than the first rotation.

A connecting member 83 is disposed rotatably on the axis 21. The connecting member 83 is detachably connected to a second sun gear S4 and a first sun gear S3 via a first control clutch C-1 and a third control clutch C-3, respectively, and is detachably connected to the second gear 81 and the third gear 82 via a first rotation control clutch C-4 and a second rotation control clutch C-5, respectively. Therefore, the connecting member 83, as a reduced-speed rotation output member 55, is switched among a first reduced-speed rotation state in which the connecting member 83 is directly connected to the second gear 81 via the first rotation control clutch C-4 so that the connecting member 83 is rotated at a first reduced-speed rotation that is slower than the input rotation, a second reduced-speed rotation state in which the connecting member 83 is connected to the third gear 82 via the second rotation control clutch C-5 so that the connecting member 83 is rotated at a reduced-speed rotation that is slower than the first reduced-speed rotation, and a free rotation state in which the first and second rotation control clutches C-4, C-5 remain disengaged so that the connecting member 83 is not restricted in rotation.

The speed-reducing gear train 75 and the connecting member 83 form a speed-reducing gear unit 49 that is connected to the input shaft 76 and that generates the first reduced-speed rotation that is slower than the rotation of the input shaft 76 and that generates the second reduced-speed rotation that is slower than the first reduced-speed rotation. The first and second rotation control clutches C-4, C-5 form rotation state switching means 50 for switching the connecting member 83 as the reduced-speed rotation output member 55 among the reduced-speed rotation states and the free rotation state. The states of operation of the control brakes and the control clutches for the gear speeds are substantially the same as in the first embodiment if the first and second rotation control clutches C-4, C-5 are operated instead of the first and second rotation control brakes B-1, B-2. The speed diagram of the speed-changing dual planetary gear unit 17 is the same as in the first embodiment.

Figure 20:
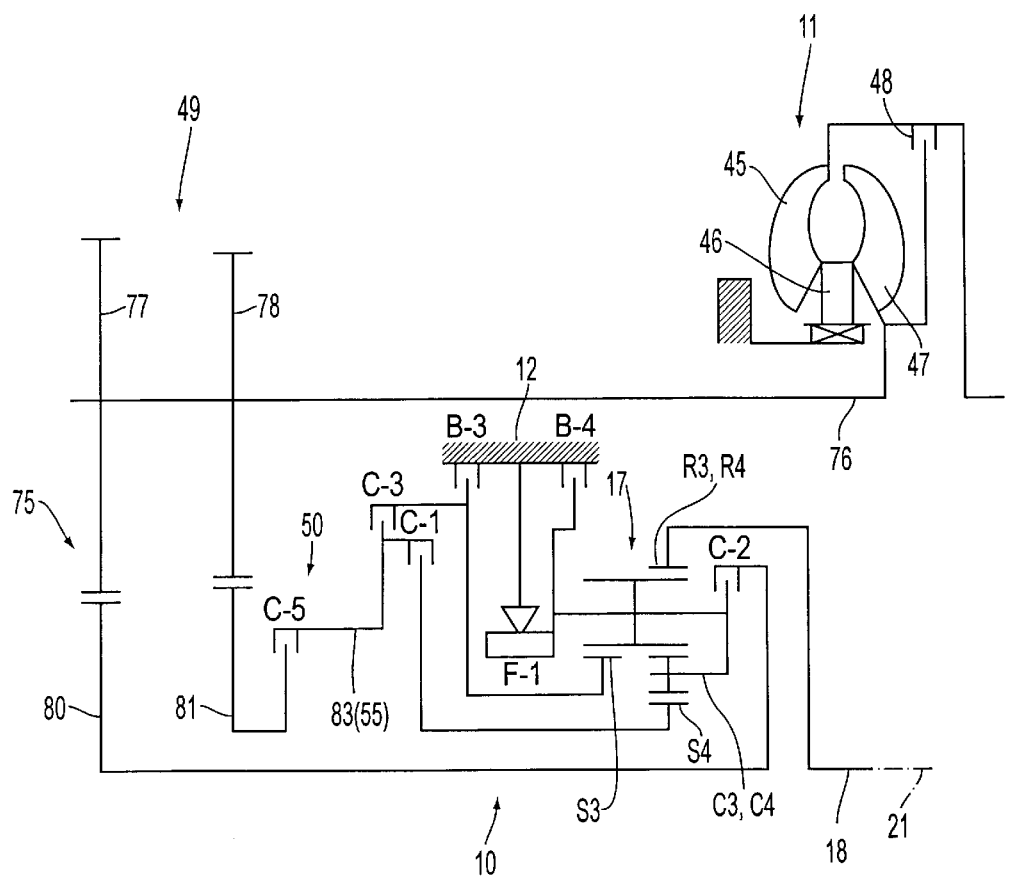
FIG. 20 is a skeleton diagram illustrating a tenth embodiment.

In the ninth embodiment, the speed-reducing gear train 75 is formed by the large, intermediate and small-diameter gears 77–79 and the first to third gears 80–82, the small-diameter gear 79 and the third gear 82 may be omitted as shown in FIG. 20.

In a tenth embodiment, shown in FIG. 20, a first gear 80 rotates at an input rotation equal in speed to the rotation of an speed-reducing planetary gear unit 72, and a second gear 81 rotates at a reduced-speed rotation that is slower than the input rotation. A connecting member 83 is detachably connected to first and second sun gears S3, S4 via third and first control clutches C-3, C-1, and is detachably connected to the second gear 81 via a rotation control clutch C-5. Therefore, the connecting member 83, as a reduced-speed rotation output member 55, is switched between a reduced-speed rotation state in which the connecting member 83 is connected to the second gear 81 via the rotation control clutch C-5 so that the connecting member 83 rotates at a reduced-speed rotation that is slower than the rotation of the input shaft 76, and a free rotation state in which the rotation control clutch C-5 remains disengaged so that the connecting member 83 is not restricted in rotation.

The speed-reducing gear train 75 and the connecting member 83 form a speed-reducing gear unit 49 that is connected to the input shaft 76 and that generates an input rotation equal in speed to the rotation of the input shaft 76 and a reduced-speed rotation that is slower than the input rotation. The rotation control clutch C-5 forms rotation state switching means 50 for switching the connecting member 83 as the reduced-speed rotation output member 55 between the reduced-speed rotation state and the free rotation state. The states of operation of the control clutches and the control brakes for the gear speeds are the same as in the sixth embodiment if the rotation control clutch C-5 is operated instead of the rotation control brake B-2. The speed diagram of the speed-changing dual planetary gear unit 17 is the same as that in the sixth embodiment.

Next described will be embodiments in which a single planetary gear unit identical to that in the third embodiment is used, and the speed-changing dual planetary gear unit 17 is formed by a dual planetary gear unit that is different from those of the foregoing embodiments. The speed-reducing planetary gear unit 70 is the same as that in the third embodiment, and is represented by a comparable reference character in the drawings, and will not be described below.

Figure 21:
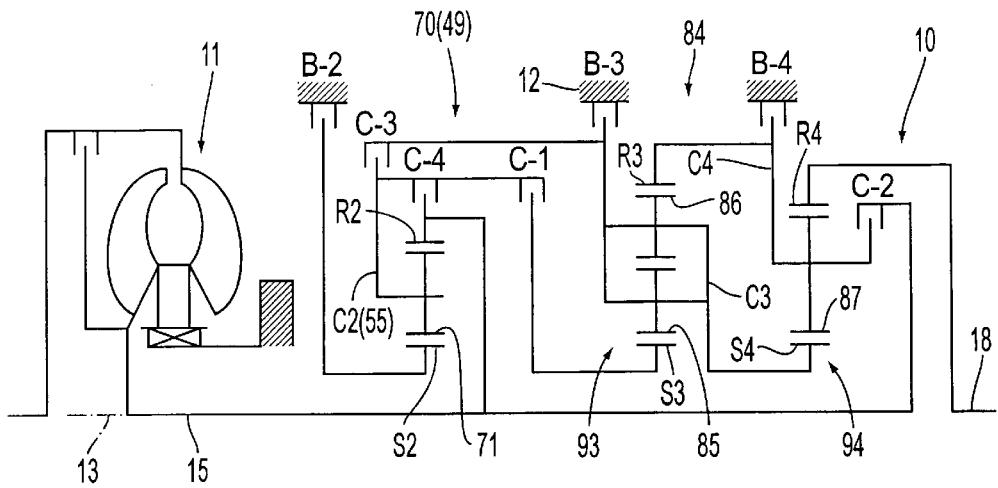
FIG. 21 is a skeleton diagram illustrating an eleventh embodiment.

In a speed-changing dual planetary gear unit 84 of an eleventh embodiment shown in FIG. 21, a carrier C3 of a double-pinion type planetary gear mechanism 93 and a sun gear S4 of a single-pinion type planetary gear mechanism 94 are connected, and a ring gear R3 and a carrier C4 are connected. Specifically, the speed-changing dual planetary gear unit 84 includes sun gears S3, S4 rotatably supported on a common axis 13, pinions 86 meshed with the sun gear S3 via intermediate pinions 85, a carrier C3 that supports the pinions 86 and the intermediate pinions 85 and that is connected to the sun gear S4 and is rotatably supported on the common axis 13, a ring gear R3 rotatably supported on the common axis 13 and meshed with the pinions 86, pinions 87 meshed with the sun gear S4, a carrier C4 that supports the pinions 87 and that is connected to the ring gear R3 and is rotatably supported on the common axis 13, and a ring gear R4 rotatably supported on the common axis 13 and meshed with the pinions 87. The ring gear R4 is connected to an output shaft 18. The carrier C3 connected to the sun gear S4 is connected with a first control brake B-3 that selectively connects the sun gear S4 and the carrier C3 to a transmission case 12 so as to restrict rotation thereof. The carrier C4 connected to the ring gear R3 is connected with a second control brake B-4 that selectively connects the ring gear R3 and the carrier C4 to the transmission case 12 so as to restrict rotation thereof.

First and third control clutches C-1, C-3 are provided for selectively transferring rotation of a carrier C2 of a speed-reducing planetary gear unit 70 to the sun gear S3 and the carrier C3, respectively, of the speed-changing dual planetary gear unit 84. A second control clutch C-2 is provided for selectively transferring rotation of an input shaft 15 to the carrier C4. Similarly to the third embodiment, a rotation control clutch C-4 selectively connects the carrier C2 of the speed-reducing planetary gear unit 70 to a ring gear R2, and a rotation control brake B-2 selectively restricts rotation of a sun gear S2. Therefore, the carrier C2 as a reduced-speed rotation output member 55 is switched among an input rotation state in which the carrier C2 is connected to the ring gear R2 via the rotation control clutch C4 so that the carrier C2 rotates at an input rotation equal in speed to the rotation of the input shaft 15, a reduced-speed rotation state in which rotation of the sun gear S2 is restricted by the rotation control brake B-2 so that the carrier C2 rotates at a reduced-speed rotation that is slower than the rotation of the input shaft 15, and a free rotation state in which the rotation control clutch C-4 and the rotation control brake B-2 remain disengaged so that the carrier C2 is not restricted in rotation.

Figure 22:
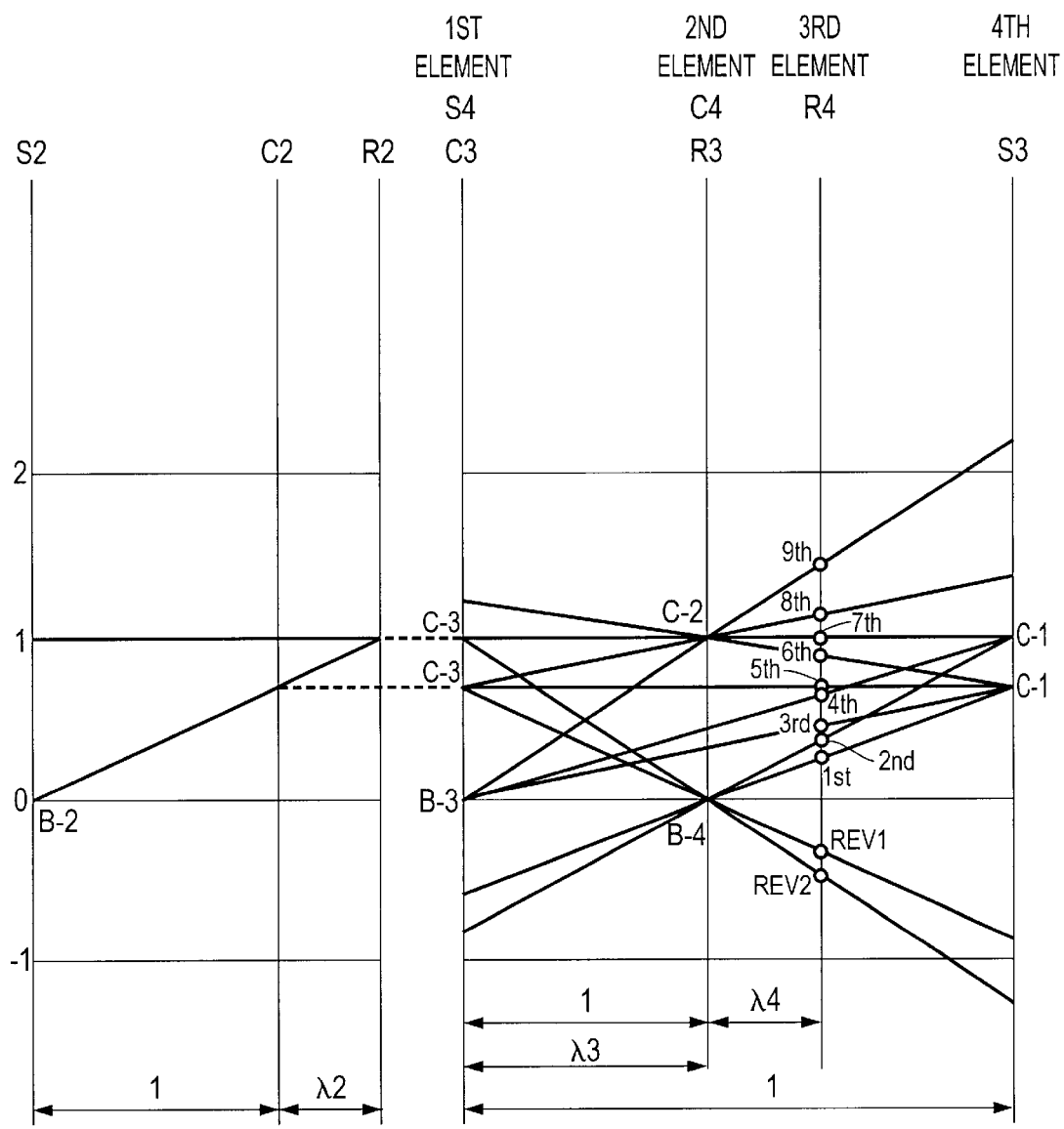
FIG. 22 is a speed diagram indicating the rotation ratios of various elements of a planetary gear unit at the gear speeds in the eleventh embodiment.

The eleventh embodiment constructed as described above is able to achieve gear ratios of nine forward speeds and two reverse speeds by selectively actuating the first and second control brakes B-3, B-4, the first to third control clutches C-1 to C-3, the rotation control clutch C-4 and the rotation control brake B-2. A speed diagram of the eleventh embodiment is shown in FIG. 22. In the eleventh embodiment, the first sun gear S4 and the carrier C3, as the first element, are connected to the third control clutch C-3 and the first control brake B-3; the ring gear R3 and the carrier C4, as the second element, are connected to the second control clutch C-2 and the second control brake B-4; the ring gear R4, as the third element, is connected to the output shaft 18; and the sun gear S3, as the fourth element, is connected to the first control clutch C-1. The states of operation of the control clutches and the control brakes for the gear speeds are the same as the states in the third embodiment shown in FIG. 8.

Figure 23:
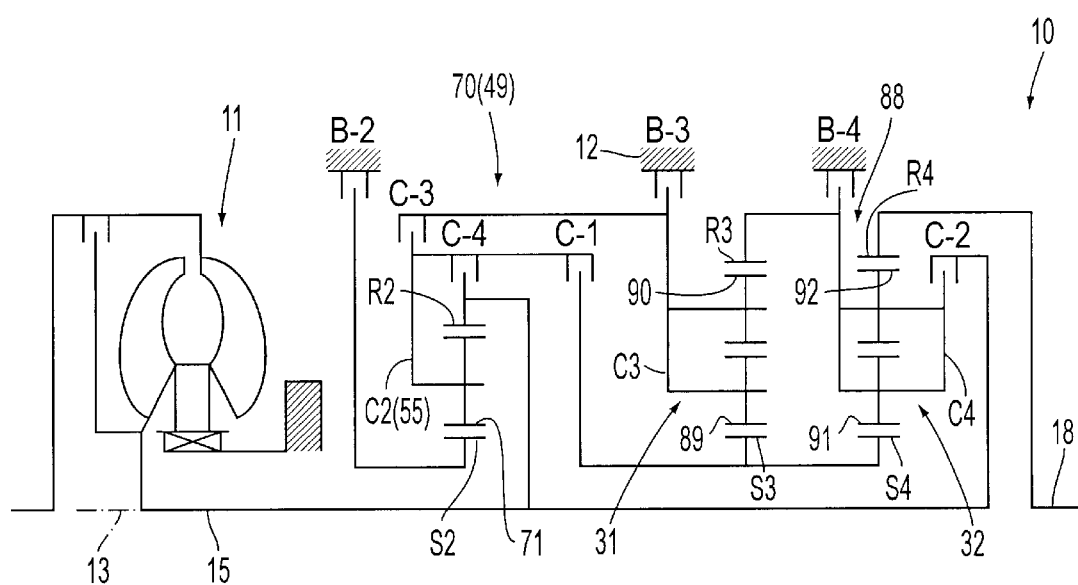
FIG. 23 is a skeleton diagram illustrating a twelfth embodiment.

In a speed-changing dual planetary gear unit 88 of a twelfth embodiment shown in FIG. 23, sun gears S3, S4 of two double-pinion type planetary gear mechanisms 31, 32 are connected, and a ring gear R3 and a carrier C4 thereof are connected. Specifically, the speed-changing dual planetary gear unit 88 includes the sun gears S3, S4 interconnected and rotatably supported on a common axis 13, pinions 90 meshed with the sun gear S3 via intermediate pinions 89, pinions 92 meshed with the sun gear S4 via intermediate pinions 91, a carrier C3 that supports the intermediate pinions 89 and the pinions 90 and that is rotatably supported on the common axis 13, the carrier C4 that supports the intermediate pinions 91 and the pinions 92 and that is connected to the ring gear R3 and is rotatably supported on the common axis 13, and a ring gear R4 that is rotatably supported on the common axis 13 and that is meshed with the pinions 92 and is connected to the output shaft 18. The carrier C3 is connected with a first control brake B-3 that selectively connects the carrier C3 to a transmission case 12 so as to restrict rotation of the carrier C3. The carrier C4 is connected with a second control brake B-4 that selectively connects the carrier C4 to the transmission case 12 so as to restrict rotation of the carrier C4. First and third control clutches C-1, C-3 are provided for selectively transferring rotation of a carrier C2 of a speed-reducing planetary gear unit 70 to the sun gear S3 and the carrier C3, respectively, of the speed-changing dual planetary gear unit 88. A second control clutch C-2 is provided for selectively transferring rotation of an input shaft 15 to the carrier C4 of the speed-changing dual planetary gear unit 88. Similarly to the third embodiment, a rotation control clutch C-4 selectively connects the carrier C2 of the speed-reducing planetary gear unit 70 to a ring gear R2, and a rotation control brake B-2 selectively restricts rotation of a sun gear S2. Therefore, the carrier C2, as a reduced-speed rotation output member 55, is switched among an input rotation state in which the carrier C2 is connected to the ring gear R2 via the rotation control clutch C-4 so that the carrier C2 rotates at an input rotation equal in speed to the rotation of the input shaft 15, a reduced-speed rotation state in which rotation of the sun gear S2 is restricted by the rotation control brake B-2 so that the carrier C2 rotates at a reduced-speed rotation that is slower than the rotation of the input shaft 15, and a free rotation state in which the rotation control clutch C-4 and the rotation control brake B-2 remain disengaged so that the carrier C2 is not restricted in rotation.

Figure 24:
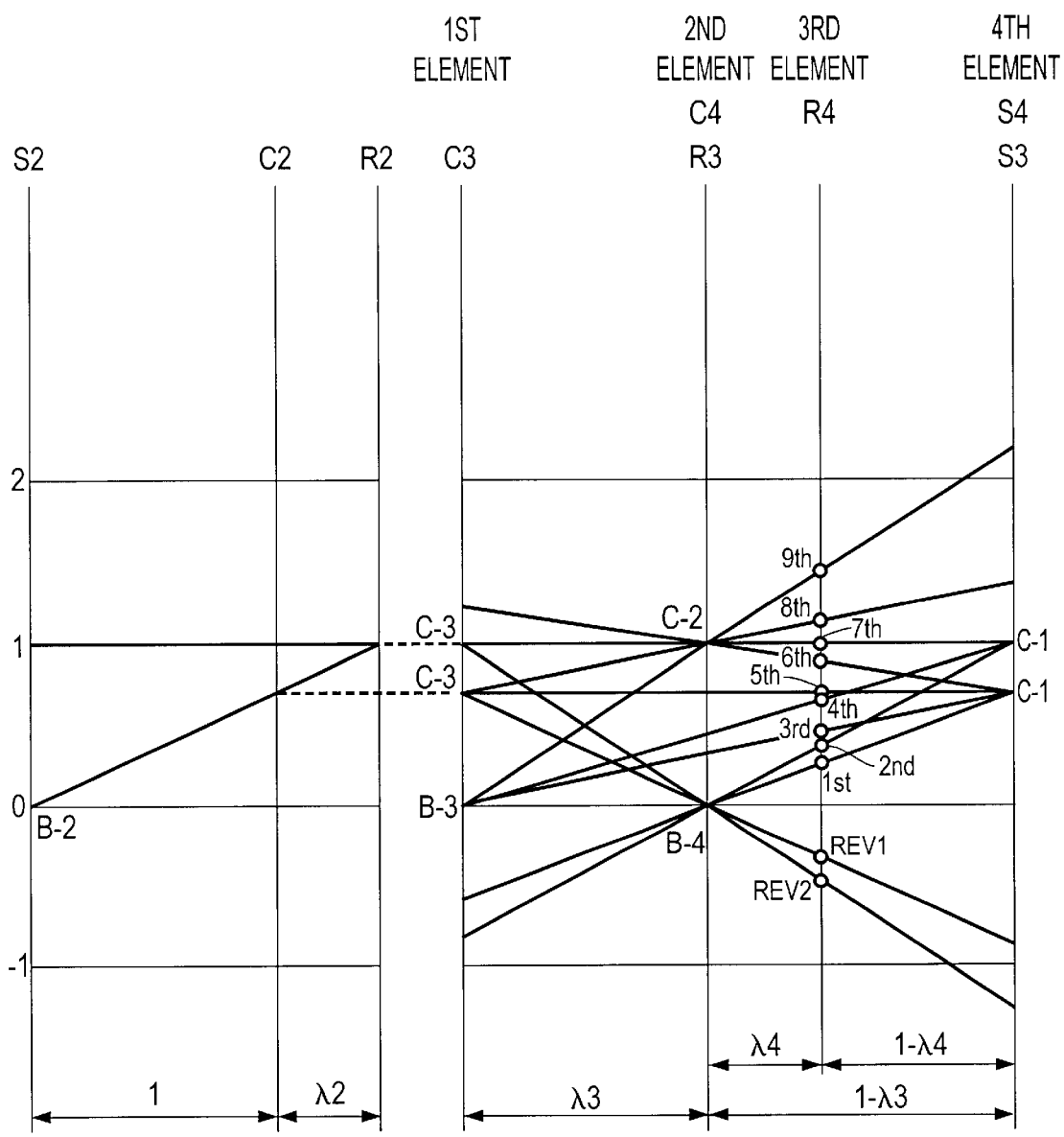
FIG. 24 is a speed diagram indicating the rotation ratios of various elements of a planetary gear unit at the gear speeds in the twelfth embodiment.

A speed diagram of the twelfth embodiment is shown in FIG. 24. In the twelfth embodiment, the carrier C3, as the first element, is connected to the third control clutch C-3 and the first control brake B-3; the ring gear R3 and the carrier C4, as the second element, are connected to the second control clutch C-2 and the second control brake B-4; the ring gear R4 as the third element is connected to the output shaft 18; and the sun gear S3 as the fourth element is connected to the first control clutch C-1. The states of operation of the control clutches and the control brakes for the gear speeds are the same as the states in the third embodiment shown in FIG. 8.

Figure 25:
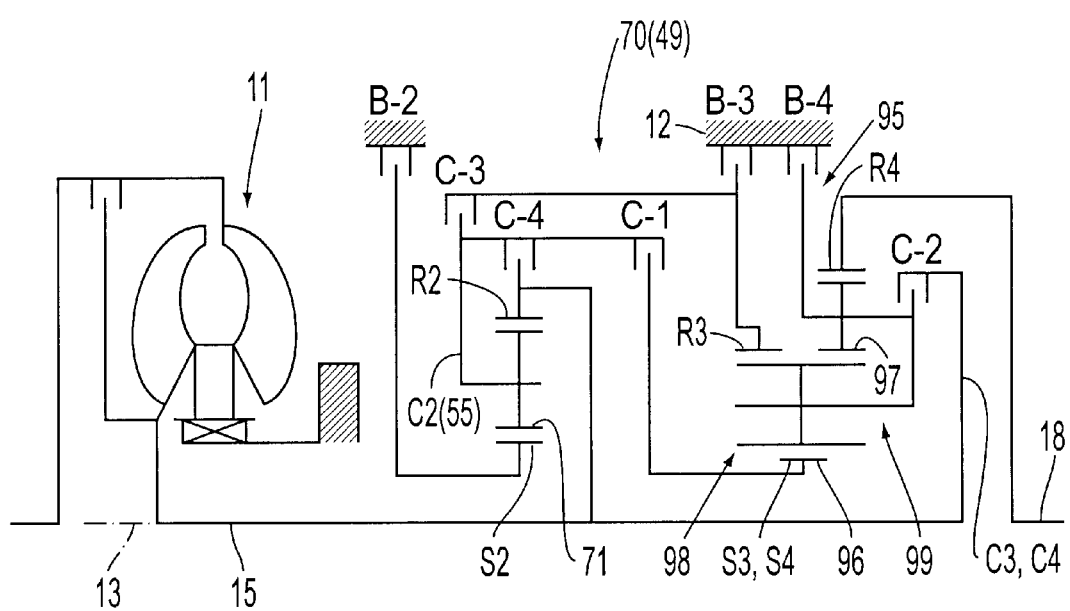
FIG. 25 is a skeleton diagram illustrating a thirteenth embodiment.

In a speed-changing dual planetary gear unit 95 in a thirteenth embodiment shown in FIG. 25, a sun gear S3 of a single-pinion type planetary gear mechanism 98 and a sun gear S4 of a double-pinion type planetary gear mechanism 99 are connected and integrated, and a carrier C3 and a carrier C4 thereof are connected and integrated. Specifically, the speed-changing dual planetary gear unit 95 includes the common sun gear S3, S4 supported rotatably on a common axis 13, a ring gear R3 supported rotatably on the common axis 13 and meshed with the sun gear S3, S4 via long pinions 96, a ring gear R4 supported rotatably on the common axis 13 and meshed with the sun gear S3, S4 via the long pinions 96 and intermediate pinions 97, and the common carrier C3, C4 supporting the long pinions 96 and the intermediate pinions 97 and rotatably supported on the common axis 13. The ring gear R4 is connected to an output shaft 18. The ring gear R3 is connected with a first control brake B-3 that selectively connects the ring gear R3 to a transmission case 12 so as to restrict rotation of the ring gear R3. The carrier C3, C4 is connected with a second control brake B-4 that selectively connects the carrier C3, C4 to the transmission case 12 so as to restrict rotation of the carrier C3, C4. First and third control clutches C-1, C-3 are provided for selectively transferring rotation of a carrier C2 of a speed-reducing planetary gear unit 70 to the sun gear S3, S4 and to the carrier C3, respectively, of the speed-changing dual planetary gear unit 95. A second control clutch C-2 is provided for selectively transferring rotation of an input shaft 15 to the carrier C3, C4 of the speed-changing dual planetary gear unit 95. Similarly to the third embodiment, a rotation control clutch C-4 selectively connects the carrier C2 of the speed-reducing planetary gear unit 70 to a ring gear R2, and a rotation control brake B-2 selectively restricts rotation of a sun gear S2. Therefore, the carrier C2, as a reduced-speed rotation output member 55, is switched among an input rotation state in which the carrier C2 is connected to the ring gear R2 via the rotation control clutch C-4 so that the carrier C2 rotates at an input rotation equal in speed to the rotation of the input shaft 15, a reduced-speed rotation state in which rotation of the sun gear S2 is restricted by the rotation control brake B-2 so that the carrier C2 rotates at a reduced-speed rotation that is slower than the rotation of the input shaft 15, and a free rotation state in which the rotation control clutch C-4 and the rotation control brake B-2 remain disengaged so that the carrier C2 is not restricted in rotation.

Figure 26:
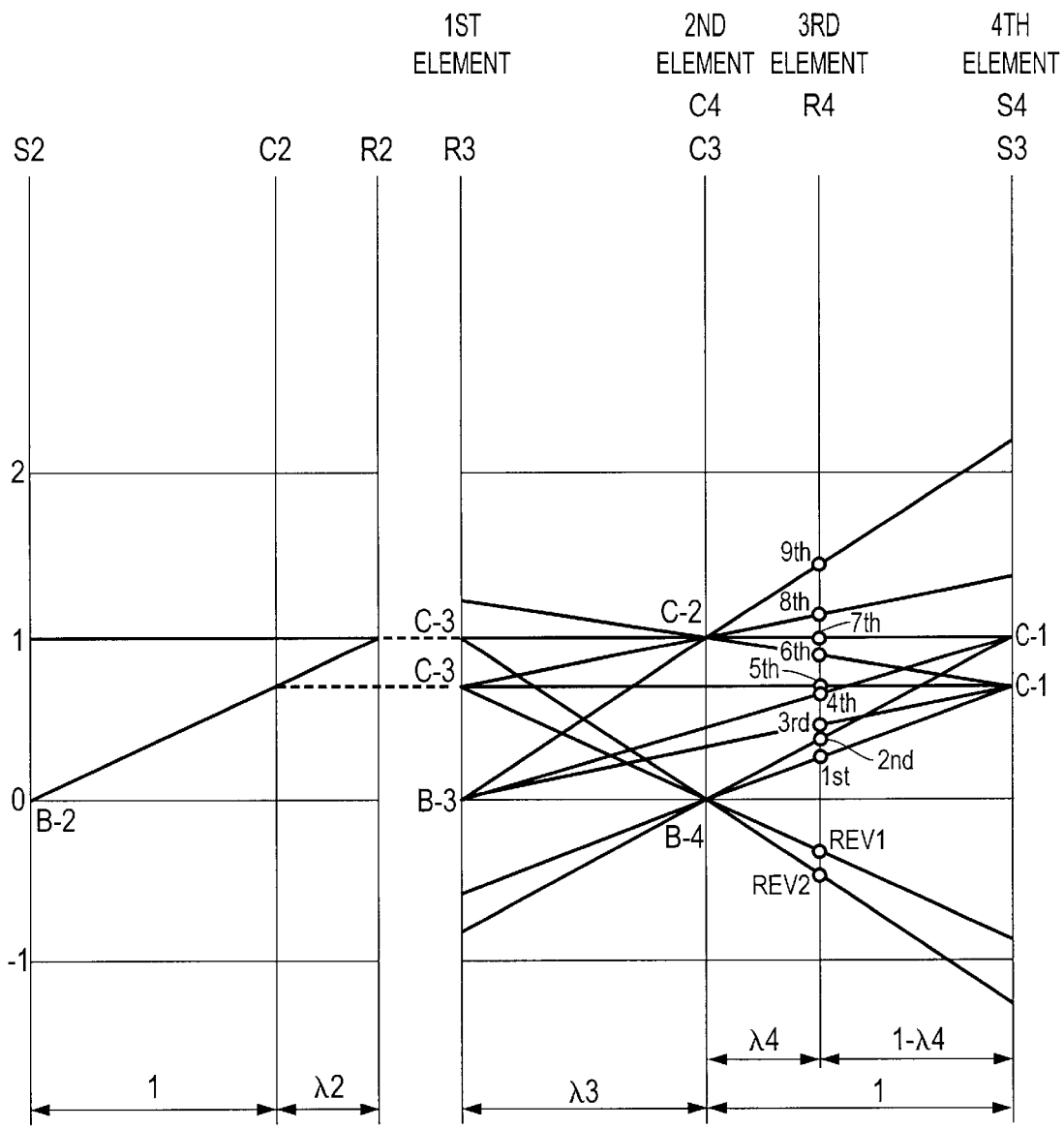
FIG. 26 is a speed diagram indicating the rotation ratios of various elements of a planetary gear unit at the gear speeds in the thirteenth embodiment.

A speed diagram of the thirteenth embodiment is shown in FIG. 26. In the thirteenth embodiment, the ring gear R3, as the first element, is connected to the third control clutch C-3 and the first control brake B-3; the carrier C3, C4, as the second element, is connected to the second control clutch C-2 and the second control brake B-4; the ring gear R4, as the third element, is connected to the output shaft 18; and the sun gear S3, S4, as the fourth element, is connected to the first control clutch C-1. The states of operation of the control clutches and the control brakes for the gear speeds are the same as the states in the third embodiment shown in FIG. 8.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. An automatic transmission comprising:
    an input shaft;
    a speed-reducing gear unit that is connected to the input shaft and that generates, on a reduced-speed rotation output member, a rotation that is slower than a rotation of the input shaft;
    a speed-changing dual planetary gear unit having in order of rotational speed, a first element, a second element, a third element and a fourth element;
    rotation state switching means for switching the reduced-speed rotation output member between a reduced-speed rotation and a free rotation state;
    a first control clutch and a third control clutch that selectively connect the reduced-speed rotation output member to the fourth element and to the first element, respectively;
    a second control clutch that selectively connects the input shaft to the second element;
    a first control brake and a second control brake that selectively stop a rotation of the first element and a rotation of the second element, respectively; and
    an output shaft connected to the third element.

2. An automatic transmission according to claim 1, wherein the rotation state switching means allows the speed-reducing gear unit to rotate the reduced-speed rotation output member at the reduced-speed rotation during the reduced-speed rotation state, and allows the speed-reducing gear unit to rotate the reduced-speed rotation output member at a rotation other than the reduced-speed rotation during the free rotation state.

3. An automatic transmission according to claim 2,
    wherein the speed-reducing gear unit comprises a speed-reducing dual planetary gear unit including:
        a small-diameter sun gear;
        a large-diameter sun gear;
        a carrier supporting a stepped pinion, the stepped pinion formed by a large-diameter pinion and a small-diameter pinion, the large-diameter pinion and the small-diameter pinion meshing with the small-diameter sun gear and the large-diameter sun gear, respectively; and
        a ring gear connected to the input shaft and meshing with the large-diameter pinion,
    wherein the carrier, as a reduced-speed rotation output member of the speed-reducing gear unit, is connected to the first control clutch and the third control clutch, and
    wherein the rotation state switching means comprises a first rotation control brake and a second rotation control brake for selectively stopping a rotation of the small-diameter sun gear and a rotation of the large-diameter sun gear, respectively.

4. An automatic transmission according to claim 2,
    wherein the speed-reducing gear unit comprises a speed-reducing dual planetary gear unit including:
        a sun gear;
        a carrier supporting a long pinion meshing with the sun gear and an intermediate pinion meshing with the long pinion;
        a first ring gear connected to the input shaft and meshing with the long pinion; and
        a second ring gear meshing with the intermediate pinion,
    wherein the carrier, as a reduced-speed rotation output member of the speed-reducing gear unit, is connected to the first control clutch and the third control clutch, and
    wherein the rotation state switching means comprises a first rotation control brake and a second rotation control brake for selectively stopping a rotation of the sun gear and a rotation of the second ring gear, respectively.

5. An automatic transmission according to claim 2,
    wherein the speed-reducing gear unit comprises a speed-reducing planetary gear unit including:
        a sun gear;
        a carrier supporting a pinion, the pinion meshing with the sun gear; and
        a ring gear connected to the input shaft and meshing with the pinion,
    wherein the carrier, as a reduced-speed rotation output member of the speed-reducing gear unit, is connected to the first control clutch and the third control clutch, and
    wherein the rotation state switching means comprises a rotation control brake for selectively restricting a rotation of the sun gear, and a control clutch for selectively connecting any two of the sun gear, the carrier and the ring gear.

6. An automatic transmission according to claim 2, wherein the speed-reducing gear unit comprises:
   a speed-reducing planetary gear unit including a sun gear restricted in rotation, a carrier supporting a pinion, the pinion meshing with the sun gear, and a ring gear connected to the input shaft, the ring gear meshing with the pinion; and
   a reduced-speed rotation output member disposed rotatably concentrically with the speed-reducing planetary gear unit and to which a rotation of the ring gear or a rotation of the carrier is selectively transferred,
   wherein the reduced-speed rotation output member is connected to the first control clutch and the third control clutch, and
   wherein the rotation state switching means comprises a first rotation control clutch and a second rotation control clutch for selectively connecting the ring gear and the carrier, respectively, to the reduced-speed rotation output member.

7. An automatic transmission according to claim 2, wherein the speed-reducing gear unit comprises a speed-reducing planetary gear unit including: a sun gear restricted in rotation; a carrier supporting a pinion, the pinion meshing with the sun gear; and a ring gear meshing with the pinion,
   wherein the carrier, as a reduced-speed rotation output member of the speed-reducing gear unit, is connected to the first control clutch and the third control clutch, and
   wherein the rotation state switching means comprises a first control clutch and a second control clutch for selectively connecting the input shaft to the carrier and to the ring gear, respectively, of the speed-reducing planetary gear unit.

8. An automatic transmission according to claim 2, wherein the speed-reducing gear unit comprises a speed-reducing planetary gear unit including: a sun gear; a carrier supporting a pinion, the pinion meshing with the sun gear; and a ring gear connected to the input shaft and meshing with the pinion,
   wherein the carrier, as a reduced-speed rotation output member of the speed-reducing gear unit, is connected to the first control clutch and the third control clutch, and
   wherein the rotation state switching means comprises a rotation control brake for selectively restricting a rotation of the sun gear.

9. An automatic transmission according to claim 2, wherein the speed-reducing gear unit comprises:
   a speed-reducing planetary gear unit including a sun gear restricted in rotation, a carrier supporting a pinion, the pinion meshing with the sun gear, and a ring gear connected to the input shaft and meshing with the pinion; and
   a reduced-speed rotation output member disposed rotatably concentrically with the speed-reducing planetary gear unit and to which a rotation of the carrier is selectively transferred,
   wherein the reduced-speed rotation output member is connected to the first control clutch and the third control clutch, and
   wherein the rotation state switching means comprises a control clutch for selectively connecting the carrier to the reduced-speed rotation output member.

10. An automatic transmission according to claim 2, wherein the speed-reducing gear unit comprises a speed-reducing planetary gear unit including: a sun gear restricted in rotation; a carrier supporting a pinion, the pinion meshing with the sun gear; and a ring gear meshing with the pinion,
    wherein the carrier, as a reduced-speed rotation output member of the speed-reducing planetary gear unit, is connected to the first control clutch and the third control clutch, and
    wherein the rotation state switching means comprises a control clutch for selectively connecting the ring gear of the speed-reducing planetary gear unit to the input shaft.

11. An automatic transmission according to claim 2, wherein the speed-reducing gear unit comprises:
    a speed-reducing gear train including a plurality of gears fixed to the input shaft, and a plurality of gears supported so as to be rotatable concentrically with the speed-changing dual planetary gear unit and meshing with the plurality of gears fixed to the input shaft; and
    a reduced-speed rotation output member disposed so as to be rotatable concentrically with the speed-changing dual planetary gear unit and to which the reduced-speed rotation is selectively transferred,
    wherein the reduced-speed rotation output member is connected to the first control clutch and the third control clutch, and
    wherein the rotation state switching means comprises a control clutch for selectively connecting the reduced-speed rotation output member to a gear of the gear train that generates the reduced-speed rotation.

12. An automatic transmission according to claim 2, wherein at least one of two planetary gear mechanisms forming the speed-changing dual planetary gear unit is a double-pinion type planetary gear mechanism, and the third element is a ring gear.

13. An automatic transmission according to claim 2, wherein the speed-changing dual planetary gear unit comprises:
    a first sun gear;
    a second sun gear;
    a long pinion, the long pinion directly meshing with the first sun gear, the long pinion meshing with the second sun gear via an intermediate pinion;
    a carrier supporting the long pinion and the intermediate pinion; and
    a ring gear meshing with the long pinion and connected to the output shaft,
    wherein the first element is the first sun gear, and the second element is the carrier, and the third element is the ring gear, and the fourth element is the second sun gear.

14. An automatic transmission according to claim 1, wherein the rotation state switching means allows the speed-reducing gear unit to generate the reduced-speed rotation on the reduced-speed rotation output member during the reduced-speed rotation state, and prevents the speed-reducing gear unit from generating the reduced-speed rotation on the reduced-speed rotation output member during the free rotation state.

15. An automatic transmission according to claim 14,
wherein the speed-reducing gear unit comprises a speed-reducing dual planetary gear unit including:
  a small-diameter sun gear;
  a large-diameter sun gear;
  a carrier supporting a stepped pinion formed by a large-diameter pinion and a small-diameter pinion, the large-diameter pinion and the small-diameter pinion meshing with the small-diameter sun gear and the large-diameter sun gear, respectively; and
  a ring gear connected to the input shaft and meshing with the large-diameter pinion,
wherein the carrier, as a reduced-speed rotation output member of the speed-reducing gear unit, is connected to the first control clutch and the third control clutch, and
wherein the rotation state switching means comprises a first control brake and a second control brake for selectively stopping a rotation of the small-diameter sun gear and a rotation of the large-diameter sun gear, respectively.

16. An automatic transmission according to claim 14,
wherein the speed-reducing gear unit comprises a speed-reducing dual planetary gear unit including:
  a sun gear;
  a carrier supporting a long pinion meshing with the sun gear and an intermediate pinion meshing with the long pinion;
  a first ring gear connected to the input shaft and meshing with the long pinion; and
  a second ring gear meshing with the intermediate pinion,
wherein the carrier, as a reduced-speed rotation output member of the speed-reducing gear unit, is connected to the first control clutch and the third control clutch, and
wherein the rotation state switching means comprises a first control brake and a second control brake for selectively stopping a rotation of the sun gear and a rotation of the second ring gear, respectively.

17. An automatic transmission according to claim 14,
wherein the speed-reducing gear unit comprises a speed-reducing planetary gear unit including:
  a sun gear;
  a carrier supporting a pinion, the pinion meshing with the sun gear; and
  a ring gear connected to the input shaft and meshing with the pinion,
wherein the carrier, as a reduced-speed rotation output member of the speed-reducing gear unit, is connected to the first control clutch and the third control clutch,
wherein the rotation state switching means comprises a rotation control brake for selectively restricting a rotation of the sun gear, and a control clutch for selectively connecting any two of the sun gear, the carrier and the ring gear.

18. An automatic transmission according to claim 14,
wherein the speed-reducing gear unit comprises:
  a speed-reducing planetary gear unit including a sun gear restricted in rotation, a carrier supporting a pinion, the pinion meshing with the sun gear, and a ring gear connected to the input shaft, the ring gear meshing with the pinion; and
  a reduced-speed rotation output member which is disposed rotatably concentrically with the speed-reducing planetary gear unit and to which a rotation of the ring gear or a rotation of the carrier is selectively transferred,
wherein the reduced-speed rotation output member is connected to the first control clutch and the third control clutch, and
wherein the rotation state switching means comprises a first control clutch and a second rotation control clutch that selectively connect the ring gear and the carrier, respectively, to the reduced-speed rotation output member.

19. An automatic transmission according to claim 14,
wherein the speed-reducing gear unit comprises a speed-reducing planetary gear unit including: a sun gear restricted in rotation; a carrier supporting a pinion, the pinion meshing with the sun gear; and a ring gear meshing with the pinion,
wherein the carrier, as a reduced-speed rotation output member of the speed-reducing gear unit, is connected to the first control clutch and the third control clutch, and
wherein the rotation state switching means comprises a first rotation control clutch and a second rotation control clutch for selectively connecting the input shaft to the carrier and to the ring gear, respectively, of the speed-reducing planetary gear unit.

20. An automatic transmission according to claim 14,
wherein the speed-reducing gear unit comprises a speed-reducing planetary gear unit including: a sun gear; a carrier supporting a pinion, the pinion meshing with the sun gear; and a ring gear connected to the input shaft and meshing with the pinion,
wherein the carrier, as a reduced-speed rotation output member of the speed-reducing gear unit, is connected to the first control clutch and the third control clutch, and
wherein the rotation state switching means comprises a rotation control brake for selectively restricting a rotation of the sun gear.

21. An automatic transmission according to claim 14,
wherein the speed-reducing gear unit comprises:
  a speed-reducing planetary gear unit including a sun gear restricted in rotation, a carrier supporting a pinion, the pinion meshing with the sun gear, and a ring gear connected to the input shaft and meshing with the pinion; and
  a reduced-speed rotation output member which is disposed rotatably concentrically with the speed-reducing planetary gear unit and to which a rotation of the carrier is selectively transferred,
wherein the reduced-speed rotation output member is connected to the first control clutch and the third control clutch, and
wherein the rotation state switching means comprises a rotation control clutch for selectively connecting the carrier to the reduced-speed rotation output member.

22. An automatic transmission according to claim 14,
wherein the speed-reducing gear unit comprises a speed-reducing planetary gear unit including: a sun gear restricted in rotation; a carrier supporting a pinion, the pinion meshing with the sun gear; and a ring gear meshing with the pinion,
wherein the carrier, as a reduced-speed rotation output member of the speed-reducing planetary gear unit, is connected to the first control clutch and the third control clutch, and wherein the rotation state switching means comprises a rotation control clutch for selectively connecting the ring gear of the speed-reducing planetary gear unit to the input shaft.

23. An automatic transmission according to claim 14, wherein the speed-reducing gear unit comprises:
   a speed-reducing gear train including a plurality of gears fixed to the input shaft, and a plurality of gears supported so as to be rotatable concentrically with the speed-changing dual planetary gear unit and meshing with the plurality of gears fixed to the input shaft; and
   a reduced-speed rotation output member disposed so as to be rotatable concentrically with the speed-changing dual planetary gear unit and to which the reduced-speed rotation is selectively transferred,
   wherein the reduced-speed rotation output member is connected to the first control clutch and the third control clutch, and
   wherein the rotation state switching means comprises a rotation control clutch for selectively connecting the reduced-speed rotation output member to a gear of the gear train that generates the reduced-speed rotation.

24. An automatic transmission according to claim 14, wherein at least one of two planetary gear mechanisms forming the speed-changing dual planetary gear unit is a double-pinion type planetary gear mechanism, and the third element is a ring gear.

25. An automatic transmission according to claim 14, wherein the speed-changing dual planetary gear unit comprises:
   a first sun gear;
   a second sun gear;
   a long pinion, the long pinion directly meshing with the first sun gear, the long pinion meshing with the second sun gear via an intermediate pinion;
   a carrier supporting the long pinion and the intermediate pinion; and
   a ring gear meshing with the long pinion and connected to the output shaft,
   wherein the first element is the first sun gear, and the second element is the carrier, and the third element is the ring gear, and the fourth element is the second sun gear.

26. An automatic transmission according to claim 1, wherein the rotation state switching means allows power transfer between the input shaft and the reduced-speed rotation output member via the speed-reducing gear unit during the reduced-speed rotation state, and prevents the power transfer between the input shaft and the reduced-speed rotation output member via the speed-reducing gear unit during the free rotation state.

27. An automatic transmission according to claim 26, wherein the speed-reducing gear unit comprises a speed-reducing dual planetary gear unit that includes:
   a small-diameter sun gear;
   a large-diameter sun gear;
   a carrier supporting a stepped pinion formed by a large-diameter pinion and a small-diameter pinion, the large-diameter pinion and the small-diameter pinion meshing with the small-diameter sun gear and the large-diameter sun gear, respectively; and
   a ring gear connected to the input shaft and that meshing with the large-diameter pinion,
   wherein the carrier, as a reduced-speed rotation output member of the speed-reducing gear unit, is connected to the first control clutch and the third control clutch, and
   wherein the rotation state switching means comprises a first control brake and a second control brake for selectively stopping a rotation of the small-diameter sun gear and a rotation of the large-diameter sun gear, respectively.

28. An automatic transmission according to claim 26, wherein the speed-reducing gear unit comprises a speed-reducing dual planetary gear unit including:
   a sun gear;
   a carrier supporting a long pinion meshing with the sun gear and an intermediate pinion meshing with the long pinion;
   a first ring gear connected to the input shaft and meshing with the long pinion; and
   a second ring gear meshing with the intermediate pinion,
   wherein the carrier, as a reduced-speed rotation output member of the speed-reducing gear unit, is connected to the first control clutch and the third control clutch, and
   wherein the rotation state switching means comprises a first rotation control brake and a second rotation control brake for selectively stopping a rotation of the sun gear and a rotation of the second ring gear, respectively.

29. An automatic transmission according to claim 26, wherein the speed-reducing gear unit comprises a speed-reducing planetary gear unit including:
   a sun gear;
   a carrier supporting a pinion, the pinion meshing with the sun gear; and
   a ring gear connected to the input shaft and meshing with the pinion,
   wherein the carrier, as a reduced-speed rotation output member of the speed-reducing gear unit, is connected to the first control clutch and the third control clutch, and
   wherein the rotation state switching means comprises a rotation control brake for selectively restricting a rotation of the sun gear, and a rotation control clutch for selectively connecting any two of the sun gear, the carrier and the ring gear.

30. An automatic transmission according to claim 26, wherein the speed-reducing gear unit comprises:
   a speed-reducing planetary gear unit including a sun gear restricted in rotation, a carrier supporting a pinion, the pinion meshing with the sun gear, and a ring gear connected to the input shaft, the ring gear meshing with the pinion; and
   a reduced-speed rotation output member disposed rotatably concentrically with the speed-reducing planetary gear unit and to which a rotation of the ring gear or a rotation of the carrier is selectively transferred, and
   wherein the reduced-speed rotation output member is connected to the first control clutch and the third control clutch, and
   wherein the rotation state switching means comprises a first rotation control clutch and a second rotation control clutch that selectively connect the ring gear and the carrier, respectively, to the reduced-speed rotation output member.

31. An automatic transmission according to claim 26, wherein the speed-reducing gear unit comprises a speed-reducing planetary gear unit including: a sun gear restricted in rotation; a carrier supporting a pinion, the pinion meshing with the sun gear; and a ring gear meshing with the pinion, wherein the carrier, as a reduced-speed rotation output member of the speed-reducing gear unit, is connected to the first control clutch and the third control clutch, and wherein the rotation state switching means comprises a first control clutch and a second control clutch for selectively connecting the input shaft to the carrier and to the ring gear, respectively, of the speed-reducing planetary gear unit.

32. An automatic transmission according to claim 26, wherein the speed-reducing gear unit comprises a speed-reducing planetary gear unit including: a sun gear; a carrier supporting a pinion, the pinion meshing with the sun gear; and a ring gear connected to the input shaft and meshing with the pinion, wherein the carrier, as a reduced-speed rotation output member of the speed-reducing gear unit, is connected to the first control clutch and the third control clutch, and wherein the rotation state switching means comprises a rotation control brake for selectively restricting a rotation of the sun gear.

33. An automatic transmission according to claim 26, wherein the speed-reducing gear unit comprises:
 a speed-reducing planetary gear unit including a sun gear restricted in rotation, a carrier supporting a pinion, the pinion meshing with the sun gear, and a ring gear connected to the input shaft and meshing with the pinion; and
 a reduced-speed rotation output member disposed rotatably concentrically with the speed-reducing planetary gear unit and to which a rotation of the carrier is selectively transferred, wherein the reduced-speed rotation output member is connected to the first control clutch and the third control clutch, and wherein the rotation state switching means comprises a rotation control clutch for selectively connecting the carrier to the reduced-speed rotation output member.

34. An automatic transmission according to claim 26, wherein the speed-reducing gear unit comprises a speed-reducing planetary gear unit including: a sun gear restricted in rotation; a carrier supporting a pinion, the pinion meshing with the sun gear; and a ring gear meshing with the pinion, and wherein the carrier, as a reduced-speed rotation output member of the speed-reducing planetary gear unit, is connected to the first control clutch and the third control clutch, and wherein the rotation state switching means comprises a rotation control clutch for selectively connecting the ring gear of the speed-reducing planetary gear unit to the input shaft.

35. An automatic transmission according to claim 26, wherein the speed-reducing gear unit comprises:
 a speed-reducing gear train including a plurality of gears fixed to the input shaft, and a plurality of gears supported so as to be rotatable concentrically with the speed-changing dual planetary gear unit and meshing with the plurality of gears fixed to the input shaft; and
 a reduced-speed rotation output member disposed so as to be rotatable concentrically with the speed-changing dual planetary gear unit and to which the reduced-speed rotation is selectively transferred, wherein the reduced-speed rotation output member is connected to the first control clutch and the third control clutch, and wherein the rotation state switching means comprises a rotation control clutch for selectively connecting the reduced-speed rotation output member to a gear of the gear train that generates the reduced-speed rotation.

36. An automatic transmission according to claim 26, wherein at least one of two planetary gear mechanisms forming the speed-changing dual planetary gear unit is a double-pinion type planetary gear mechanism, and the third element is a ring gear.

37. An automatic transmission according to claim 26, wherein the speed-changing dual planetary gear unit comprises:
 a first sun gear;
 a second sun gear;
 a long pinion, the long pinion directly meshing with the first sun gear, the long pinion meshing with the second sun gear via an intermediate pinion;
 a carrier supporting the long pinion and the intermediate pinion; and
 a ring gear meshing with the long pinion and connected to the output shaft, wherein the first element is the first sun gear, and the second element is the carrier, and the third element is the ring gear, and the fourth element is the second sun gear.

38. An automatic transmission according to claim 1, wherein the speed-reducing gear unit comprises a speed-reducing dual planetary gear unit including:
 a small-diameter sun gear;
 a large-diameter sun gear;
 a carrier supporting a stepped pinion formed by a large-diameter pinion and a small-diameter pinion, the large-diameter pinion and the small-diameter pinion meshing with the small-diameter sun gear and the large-diameter sun gear, respectively; and
 a ring gear that is connected to the input shaft and meshing with the large-diameter pinion, and wherein the carrier, as a reduced-speed rotation output member of the speed-reducing gear unit, is connected to the first control clutch and the third control clutch, and wherein the rotation state switching means comprises a first rotation control brake and a second rotation control brake for selectively stopping a rotation of the small-diameter sun gear and a rotation of the large-diameter sun gear, respectively.

39. An automatic transmission according to claim 1, wherein the speed-reducing gear unit comprises a speed-reducing dual planetary gear unit including:
 a sun gear;
 a carrier supporting a long pinion meshing with the sun gear and an intermediate pinion meshing with the long pinion;
 a first ring gear connected to the input shaft and meshing with the long pinion; and
 a second ring gear meshing with the intermediate pinion, wherein the carrier, as a reduced-speed rotation output member of the speed-reducing gear unit, is connected to the first control clutch and the third control clutch, and wherein the rotation state switching means comprises a first rotation control brake and a second rotation control brake for selectively stopping a rotation of the sun gear and a rotation of the second ring gear, respectively.

40. An automatic transmission according to claim 1,
wherein the speed-reducing gear unit comprises a speed-reducing planetary gear unit including:
a sun gear;
a carrier supporting a pinion, the pinion meshing with the sun gear; and
a ring gear connected to the input shaft and meshing with the pinion,
wherein the carrier, as a reduced-speed rotation output member of the speed-reducing gear unit, is connected to the first control clutch and the third control clutch, and
wherein the rotation state switching means comprises a rotation control brake for selectively restricting a rotation of the sun gear, and a rotation control clutch for selectively connecting any two of the sun gear, the carrier and the ring gear.

41. An automatic transmission according to claim 1,
wherein the speed-reducing gear unit comprises:
a speed-reducing planetary gear unit including a sun gear restricted in rotation, a carrier supporting a pinion, the pinion meshing with the sun gear, and a ring gear connected to the input shaft, the ring gear meshing with the pinion; and
a reduced-speed rotation output member disposed rotatably concentrically with the speed-reducing planetary gear unit and to which a rotation of the ring gear or a rotation of the carrier is selectively transferred,
wherein the reduced-speed rotation output member is connected to the first control clutch and the third control clutch, and
wherein the rotation state switching means comprises a first rotation control clutch and a second rotation control clutch for selectively connecting the ring gear and the carrier, respectively, to the reduced-speed rotation output member.

42. An automatic transmission according to claim 1,
wherein the speed-reducing gear unit comprises a speed-reducing planetary gear unit including: a sun gear restricted in rotation; a carrier supporting a pinion, the pinion meshing with the sun gear; and a ring gear meshing with the pinion, and
wherein the carrier, as a reduced-speed rotation output member of the speed-reducing gear unit, is connected to the first control clutch and the third control clutch, and
wherein the rotation state switching means comprises a first rotation control clutch and a second rotation control clutch for selectively connecting the input shaft to the carrier and to the ring gear, respectively, of the speed-reducing planetary gear unit.

43. An automatic transmission according to claim 1,
wherein the speed-reducing gear unit comprises a speed-reducing planetary gear unit including: a sun gear; a carrier supporting a pinion, the pinion meshing with the sun gear; and a ring gear connected to the input shaft and meshing with the pinion,
wherein the carrier, as a reduced-speed rotation output member of the speed-reducing gear unit, is connected to the first control clutch and the third control clutch, and wherein the rotation state switching means comprises a rotation control brake for selectively restricting a rotation of the sun gear.

44. An automatic transmission according to claim 1,
wherein the speed-reducing gear unit comprises:
a speed-reducing planetary gear unit including a sun gear restricted in rotation, a carrier supporting a pinion, the pinion meshing with the sun gear, and a ring gear connected to the input shaft and meshing with the pinion; and
a reduced-speed rotation output member which is disposed rotatably concentrically with the speed-reducing planetary gear unit and to which a rotation of the carrier is selectively transferred,
wherein the reduced-speed rotation output member is connected to the first control clutch and the third control clutch, and
wherein the rotation state switching means comprises a rotation control clutch for selectively connecting the carrier to the reduced-speed rotation output member.

45. An automatic transmission according to claim 1,
wherein the speed-reducing gear unit comprises a speed-reducing planetary gear unit including: a sun gear restricted in rotation; a carrier supporting a pinion, the pinion meshing with the sun gear; and a ring gear meshing with the pinion, and
wherein the carrier, as a reduced-speed rotation output member of the speed-reducing planetary gear unit, is connected to the first control clutch and the third control clutch, and
wherein the rotation state switching means comprises a rotation control clutch for selectively connecting the ring gear of the speed-reducing planetary gear unit to the input shaft.

46. An automatic transmission according to claim 1,
wherein the speed-reducing gear unit comprises:
a speed-reducing gear train including a plurality of gears fixed to the input shaft, and a plurality of gears supported so as to be rotatable concentrically with the speed-changing dual planetary gear unit and meshing with the plurality of gears fixed to the input shaft; and
a reduced-speed rotation output member disposed so as to be rotatable concentrically with the speed-changing dual planetary gear unit and to which the reduced-speed rotation is selectively transferred,
wherein the reduced-speed rotation output member is connected to the first control clutch and the third control clutch, and
wherein the rotation state switching means comprises a rotation control clutch for selectively connecting the reduced-speed rotation output member to a gear of the gear train that generates the reduced-speed rotation.

47. An automatic transmission according to claim 1, wherein at least one of two planetary gear mechanisms forming the speed-changing dual planetary gear unit is a double-pinion type planetary gear mechanism, and the third element is a ring gear.

48. An automatic transmission according to claim 1,
wherein the speed-changing dual planetary gear unit comprises:
a first sun gear;
a second sun gear;
a long pinion, the long pinion directly meshing with the first sun gear, the long pinion meshing with the second sun gear via an intermediate pinion;

a carrier supporting the long pinion and the intermediate pinion; and a ring gear meshing with the long pinion and connected to the output shaft, wherein the first element is the first sun gear, and the second element is the carrier, and the third element is the ring gear, and the fourth element is the second sun gear.

49. An automatic transmission comprising:

an input shaft;

a speed-reducing gear unit that is connected to the input shaft and that generates a first rotation and a second rotation at least one of which is reduced in speed so as to be slower than a rotation of the input shaft;

a speed-changing dual planetary gear unit having in order of rotational speed, a first element, a second element, a third element and a fourth element;

a first control clutch and a third control clutch that selectively transfers a selected one of the first rotation and the second rotation to the first element and the fourth element;

rotation selecting means for selecting one of the first rotation and the second rotation and transferring the one of the first rotation and the second rotation to the first control clutch and the third control clutch;

a second control clutch that selectively transfers the rotation of the input shaft to the second element;

a first control brake and a second control brake that selectively stop a rotation of the first element and a rotation of the second element; and an output shaft connected to the third element.

50. An automatic transmission according to claim 49, wherein at least one of two planetary gear mechanisms that form the speed-changing dual planetary gear unit is a double-pinion type planetary gear mechanism, and the third element is a ring gear.

51. An automatic transmission according to claim 49, wherein the speed-changing dual planetary gear unit comprises:

a first sun gear;

a second sun gear;

a long pinion meshing with the first sun gear and meshing with the second sun gear via an intermediate pinion;

a carrier supporting the long pinion and the intermediate pinion; and a ring gear meshing with the long pinion and connected to the output shaft, and wherein the first element is the first sun gear, the second element is the carrier, the third element is the ring gear, and the fourth element is the second sun gear.

52. An automatic transmission according to claim 49, wherein the speed-reducing gear unit comprises a speed-reducing dual planetary gear unit including:

a small-diameter sun gear;

a large-diameter sun gear;

a carrier supporting a stepped pinion, the stepped pinion formed by a large-diameter pinion and a small-diameter pinion, the large-diameter pinion and the small-diameter pinion meshing with the small-diameter sun gear and the large-diameter sun gear, respectively; and a ring gear connected to the input shaft and meshing with the large-diameter pinion, wherein the carrier of the speed-reducing dual planetary gear unit is connected to the first control clutch and the third control clutch, and wherein the rotation selecting means comprises a first control brake and a second control brake for causing the carrier to selectively generate the first rotation and the second rotation by restricting a rotation of the small-diameter sun gear and a rotation of the large-diameter sun gear, respectively.

53. An automatic transmission according to claim 49, wherein the speed-reducing gear unit comprises a speed-reducing dual planetary gear unit including:

a sun gear;

a long pinion;

a carrier supporting the long pinion, the long pinion meshing with the sun gear, the carrier supporting an intermediate pinion meshing with the long pinion;

a first ring gear connected to the input shaft and meshing with the long pinion; and a second ring gear meshing with the intermediate pinion, and wherein the carrier of the speed-reducing dual planetary gear unit is connected to the first control clutch and the third control clutch, and wherein the rotation selecting means comprises a first control brake and a second control brake for causing the carrier to selectively generate the first rotation and the second rotation by restricting a rotation of the sun gear and a rotation of the ring gear, respectively.

54. An automatic transmission according to claim 49, wherein the speed-reducing gear unit comprises a speed-reducing planetary gear unit including:

a sun gear;

a carrier supporting a pinion, the pinion meshing with the sun gear; and a ring gear connected to the input shaft and meshing with the pinion, and wherein the carrier of the speed-reducing planetary gear unit is connected to the first control clutch and the third control clutch, and wherein the rotation selecting means comprises a second control brake that causes the carrier to generate the second rotation by restricting a rotation of the sun gear, and a first control clutch that causes the carrier to generate the first rotation by connecting any two of the sun gear, the carrier and the ring gear.

55. An automatic transmission according to claim 49, wherein the speed-reducing gear unit comprises speed-reducing planetary gear unit including: a sun gear restricted in rotation; a carrier supporting a pinion, the pinion meshing with the sun gear; and a ring gear connected to the input shaft and meshing with the pinion;

wherein a connecting member disposed rotatably concentrically with the speed-reducing planetary gear unit is connected to the first control clutch and the third control clutch, and wherein the rotation selecting means comprises a second control clutch for transferring the second rotation generated on the carrier to the connecting member, and a first control clutch for transferring the first rotation generated on the ring gear to the connecting member.

56. An automatic transmission according to claim 49, wherein the speed-reducing gear unit is a speed-reducing planetary gear unit that comprises: a sun gear restricted in rotation; a carrier supporting a pinion, the pinion meshing with the sun gear; and a ring gear meshing with the pinion, wherein the first control clutch and the third control clutch are connected to the carrier of the speed-reducing planetary gear unit, and wherein the rotation selecting means comprises: a second control clutch for causing the carrier to generate the second rotation by connecting the input shaft to the ring gear of the speed-reducing planetary gear unit; and a first control clutch for causing the carrier to generate the first rotation by connecting the input shaft to the carrier.

57. An automatic transmission according to claim 49, wherein the speed-reducing gear unit comprises a speed-reducing gear train that includes: a first plurality of gears fixed to the input shaft; and a second plurality of gears that are supported so as to be rotatable concentrically with the speed-changing dual planetary gear unit, the second plurality of gear meshing with the first plurality of gears, wherein a connecting member disposed so as to be rotatable concentrically with the speed-changing planetary gear unit is connected to the first control clutch and the third control clutch, and wherein the rotation selecting means comprises a first control clutch and a second control clutch for transferring the first rotation and the second rotation, respectively, generated by the speed-reducing gear train, to the connecting member.

58. An automatic transmission comprising:

an input shaft;

a speed-chaning dual planetary gear unit having in order of rotation speed, a first element, a second element, a third element and a fourth element;

a speed-reducing planetary gear unit having a fifth element that is connected to the input shaft, a sixth element as a reduced-speed rotation output memeber, and a seventh element, wherein a rotation of the reduced-speed rotation output member is slower than a rotation of the input shaft;

a first control clutch and a third control clutch that selectively connect the reduced-speed rotation output member to the fourth element and to the first element, respectively;

a second control clutch that selectively connects the input shaft to the second element;

a first control brake and a second control brake that selectively stop a rotation of the first element and a rotation of the second element, respectively;

an output shaft connected to the third element; and a third control brake that selectively stops a rotation of the seventh element.

59. An automatic transmission according to claim 58, wherein the seventh element is a sun gear.

60. An automatic transmission according to claim 58, wherein a plurality of gear speeds is achieved by controlling a plurality of the control clutches and the control brakes, and wherein a predetermined gear speed is achieved by engaging the first control clutch, the second control clutch and the third control clutch, and by disengaging the first control brake, the second control brake and the third control brake.

61. An automatic transmission according to claim 58, wherein the speed-changing dual planetary gear unit comprises:

a first sun gear;

a second sun gear;

a long pinion, the long pinion directly meshing with the first sun gear, the long pinion meshing with the second sun gear via an intermediate pinon;

a carrier supporting the long pinion and the intermediate pinion; and a ring gear meshing with the long pinion and connected top the output shaft, wherein the first element is the first sun gear, the second element is the carrier, the third element is the ring gear, and the fourth element is the second sun gear.

\* \* \* \* \*